United States Patent
Kim et al.

(10) Patent No.: US 11,917,193 B2
(45) Date of Patent: Feb. 27, 2024

(54) INTER PREDICTION METHOD AND APPARATUS FOR SAME

(71) Applicants: ELECTRONICS AND TELECOMMUNICATIONS RESEARCH INSTITUTE, Daejeon (KR); University-Industry Cooperation Group of Kyung Hee University, Yongin-si (KR)

(72) Inventors: Hui Yong Kim, Daejeon-si (KR); Gwang Hoon Park, Seongnam-si (KR); Kyung Yong Kim, Suwon-si (KR); Sang Min Kim, Yongin-si (KR); Sung Chang Lim, Daejeon-si (KR); Jin Ho Lee, Daejeon-si (KR); Jin Soo Choi, Daejeon-si (KR); Jin Woong Kim, Daejeon-si (KR)

(73) Assignees: ELECTRONICS AND TELECOMMUNICATIONS RESEARCH INSTITUTE, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 16/781,438

(22) Filed: Feb. 4, 2020

(65) Prior Publication Data
US 2020/0177912 A1    Jun. 4, 2020

Related U.S. Application Data

(63) Continuation of application No. 16/132,886, filed on Sep. 17, 2018, now Pat. No. 10,587,893, which is a
(Continued)

(30) Foreign Application Priority Data

Jul. 12, 2011   (KR) .................. 10-2011-0069166
Jul. 18, 2011   (KR) .................. 10-2011-0071171
(Continued)

(51) Int. Cl.
*H04N 19/577*   (2014.01)
*H04N 19/503*   (2014.01)
(Continued)

(52) U.S. Cl.
CPC ......... *H04N 19/577* (2014.11); *H04N 19/109* (2014.11); *H04N 19/176* (2014.11);
(Continued)

(58) Field of Classification Search
CPC combination set(s) only.
See application file for complete search history.

(56) References Cited

U.S. PATENT DOCUMENTS

2003/0072374 A1    4/2003  Sohm
2004/0047418 A1*   3/2004  Tourapis ................ H04N 19/19
                                                         375/E7.199
(Continued)

OTHER PUBLICATIONS

Bross, B. et al. "Joint Collaborative Team on Video Coding (JCT-VC) of ITU-T SG16 WP3 and ISO/IEC JTC1/SC29/WG11." 7th Meeting, Geneva, Switzerland. 2011 (18 pages).

*Primary Examiner* — Md N Haque
(74) *Attorney, Agent, or Firm* — Michael Best & Friedrich LLP

(57) ABSTRACT

According to the present invention, an image encoding apparatus comprises: a motion prediction unit which derives motion information on a current block in the form of the motion information including L0 motion information and L1 motion information; a motion compensation unit which performs a motion compensation for the current block on the
(Continued)

basis of at least one of the L0 motion information and L1 motion information so as to generate a prediction block corresponding to the current block; and a restoration block generating unit which generates a restoration block corresponding to the current block based on the prediction block. According to the present invention, image encoding efficiency can be improved.

5 Claims, 15 Drawing Sheets

Related U.S. Application Data continuation of application No. 15/706,884, filed on Sep. 18, 2017, now Pat. No. 10,136,157, which is a continuation of application No. 14/131,734, filed as application No. PCT/KR2012/005531 on Jul. 12, 2012, now Pat. No. 9,819,963.

(30) Foreign Application Priority Data

| Jul. 19, 2011 | (KR) | ......................... 10-2011-0071658 |
| Aug. 18, 2011 | (KR) | ......................... 10-2011-0082395 |
| Jul. 12, 2012 | (KR) | ......................... 10-2012-0075901 |

(51) Int. Cl.

| H04N 19/176 | (2014.01) |
| H04N 19/513 | (2014.01) |
| H04N 19/593 | (2014.01) |
| H04N 19/109 | (2014.01) |
| H04N 19/52 | (2014.01) |
| H04N 19/119 | (2014.01) |
| H04N 19/61 | (2014.01) |
| H04N 19/107 | (2014.01) |
| H04N 19/82 | (2014.01) |

(52) U.S. Cl.
CPC ......... *H04N 19/503* (2014.11); *H04N 19/513* (2014.11); *H04N 19/52* (2014.11); *H04N 19/593* (2014.11); *H04N 19/107* (2014.11); *H04N 19/119* (2014.11); *H04N 19/61* (2014.11); *H04N 19/82* (2014.11)

(56) References Cited

U.S. PATENT DOCUMENTS

| 2004/0234143 | A1 | 11/2004 | Hagai et al. | |
| 2005/0062885 | A1 | 3/2005 | Kadono et al. | |
| 2007/0019731 | A1* | 1/2007 | Huang | H04N 19/51 375/E7.123 |
| 2007/0160143 | A1 | 7/2007 | Lee | |
| 2008/0117977 | A1 | 5/2008 | Lee et al. | |
| 2009/0002379 | A1* | 1/2009 | Baeza | H04N 19/43 345/522 |
| 2009/0034618 | A1 | 2/2009 | Fu et al. | |
| 2009/0060359 | A1 | 3/2009 | Kim et al. | |
| 2009/0154549 | A1* | 6/2009 | Yang | H04N 19/51 375/240.01 |
| 2010/0135387 | A1 | 6/2010 | Divorra Escoda et al. | |
| 2010/0239002 | A1 | 9/2010 | Park et al. | |
| 2011/0075042 | A1* | 3/2011 | Wang | G06T 5/002 348/669 |
| 2011/0310295 | A1* | 12/2011 | Chen | H04N 19/577 348/E7.003 |
| 2012/0008688 | A1* | 1/2012 | Tsai | H04N 19/176 375/E7.125 |
| 2012/0106646 | A1* | 5/2012 | Cammas | H04N 19/176 375/240.18 |
| 2012/0224637 | A1 | 9/2012 | Sugio et al. | |
| 2012/0263235 | A1 | 10/2012 | Sugio et al. | |
| 2012/0269270 | A1 | 10/2012 | Chen et al. | |
| 2013/0170549 | A1 | 7/2013 | Li et al. | |
| 2017/0048529 | A1 | 2/2017 | Kim et al. | |

\* cited by examiner

INTER PREDICTION METHOD AND APPARATUS FOR SAME

CROSS-REFERENCE TO RELATED APPLICATIONS

This application is a Continuation Application of U.S. application Ser. No. 16/132,886 filed on Sep. 17, 2018, now U.S. Pat. No. 10,587,893 issued on Mar. 10, 2020, which is a Continuation Application of U.S. application Ser. No. 15/706,884 filed on Sep. 18, 2017, now U.S. Pat. No. 10,136,157 issued on Nov. 20, 2018, which is a Continuation Application of U.S. application Ser. No. 14/131,734 filed on Jan. 9, 2014, now U.S. Pat. No. 9,819,963 issued on Nov. 14, 2017, which is a U.S. national stage application of International Application No. PCT/KR2012/005531 filed on Jul. 12, 2012, which claims the benefit of Korean Application Nos. 10-2012-0075901, 10-2011-0082395, 10-2011-0071658, 10-2011-0071171, 10-2011-0069166 filed on Jul. 12, 2012, Aug. 18, 2011, Jul. 19, 2011, Jul. 18, 2011, and Jul. 12, 2011, the entire disclosures of which are incorporated herein by reference for all purposes.

TECHNICAL FIELD

The present invention relates to image processing, and more particularly, to an inter prediction method and apparatus.

BACKGROUND ART

Recently, in accordance with the expansion of broadcasting services having high definition (HD) resolution in the country and around the world, many users have been accustomed to a high resolution and definition image, such that many organizations have attempted to develop the next-generation video devices. In addition, as the interest in HDTV and ultra high definition (UHD) having a resolution four times higher than that of HDTV have increased, a compression technology for a higher-resolution and higher-definition image has been demanded.

For image compression, an inter prediction technology of predicting pixel values included in a current picture from a picture before and/or after the current picture, an intra prediction technology of predicting pixel values included in a current picture using pixel information in the current picture, an entropy encoding technology of allocating a short code to symbols having a high appearance frequency and a long code to symbols having a low appearance frequency, or the like, may be used.

DISCLOSURE

Technical Problem

The present invention provides an image encoding method and apparatus capable of improving image encoding efficiency.

The present invention also provides an image decoding method and apparatus capable of improving image encoding efficiency.

The present invention also provides an inter prediction method and apparatus capable of improving image encoding efficiency.

The present invention also provides a method and apparatus of deriving motion information capable of improving image encoding efficiency.

The present invention also provides a method and apparatus of deriving temporal motion information capable of improving image encoding efficiency.

Technical Solution

In an aspect, an image decoding apparatus is provided. The image decoding apparatus includes: a motion estimating unit deriving motion information of a current block as motion information including L0 motion information and L1 motion information; a motion compensating unit performing motion compensation on the current block based on at least one of the L0 motion information and the L1 motion information to generate a prediction block corresponding to the current block; and a reconstructed block generating unit generating a reconstructed block corresponding to the current block based on the prediction block, wherein the motion compensating unit perform the motion compensation based on whether or not the L0 motion information and the L1 motion information are the same as each other.

The L0 motion information may include an L0 motion vector and an L0 reference picture number, wherein the L0 reference picture number indicates a picture order count (POC) allocated to an L0 reference picture, and the L1 motion information may include an L1 motion vector and an L1 reference picture number, wherein the L1 reference picture number indicates a picture order count (POC) allocated to an L1 reference picture.

In the case in which the L0 motion vector and the L1 motion vector are the same as each other and the L0 reference picture number and the L1 reference picture number are the same as each other, the motion compensating unit may perform uni-prediction based on the L0 motion information of the L0 motion information and the L1 motion information.

In the case in which the L0 motion vector and the L1 motion vector are not the same as each other or the L0 reference picture number and the L1 reference picture number are not the same as each other, the motion compensating unit may perform bi-prediction based on the L0 motion information and the L1 motion information.

In another aspect, an image decoding apparatus is provided. The image decoding apparatus includes: a motion estimating unit deriving motion information of a current block as motion information including L0 motion information and L1 motion information; a motion compensating unit performing motion compensation on the current block based on at least one of the L0 motion information and the L1 motion information to generate a prediction block corresponding to the current block; and a reconstructed block generating unit generating a reconstructed block corresponding to the current block based on the prediction block, wherein the motion compensating unit perform the motion compensation based on a size of the current block.

In the case in which the size of the current block is smaller than a predetermined size, the motion compensating unit may perform uni-prediction based on the L0 motion information of the L0 motion information and the L1 motion information.

The predetermined size may be 8×8.

In still another aspect, an image decoding apparatus is provided. The image decoding apparatus includes: a motion estimating unit deriving motion information from a previously reconstructed picture; a motion compensating unit generating a prediction block corresponding to a current block based on the derived motion information; and a reconstructed block generating unit generating a reconstructed block corresponding to the current block based on the prediction block, wherein the motion information includes a motion vector and a reference picture index, and wherein the motion estimating unit sets the reference picture index to 0 and derives the motion vector based on a collocated block corresponding to the current block within the previously reconstructed picture.

An encoding mode of the current block may be a merge mode, and the motion compensating unit may select temporal motion information as motion information of the current block and perform motion compensation based on the selected motion information to generate the prediction block corresponding to the current block.

Advantageous Effects

With the image encoding method according to the present invention, image encoding efficiency may be improved.

With the image decoding method according to the present invention, image encoding efficiency may be improved.

With the inter prediction method according to the present invention, image encoding efficiency may be improved.

With the method of deriving motion information according to the present invention, image encoding efficiency may be improved.

With the method of deriving temporal motion information according to the present invention, image encoding efficiency may be improved.

MODE FOR INVENTION

Hereinafter, embodiments of the present invention will be described in detail with reference to the accompanying drawings. In describing embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional unit is constituted in a constitutional unit of separated hardware or one software. In other words, each constitutional unit includes each of enumerated constitutional parts for convenience of explanation. Thus, at least two constitutional parts of each constitutional unit may be combined to form one constitutional unit or one constitutional unit may be divided into a plurality of constitutional parts to perform each function. The embodiment where each constitutional unit is combined and the embodiment where one constitutional unit is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
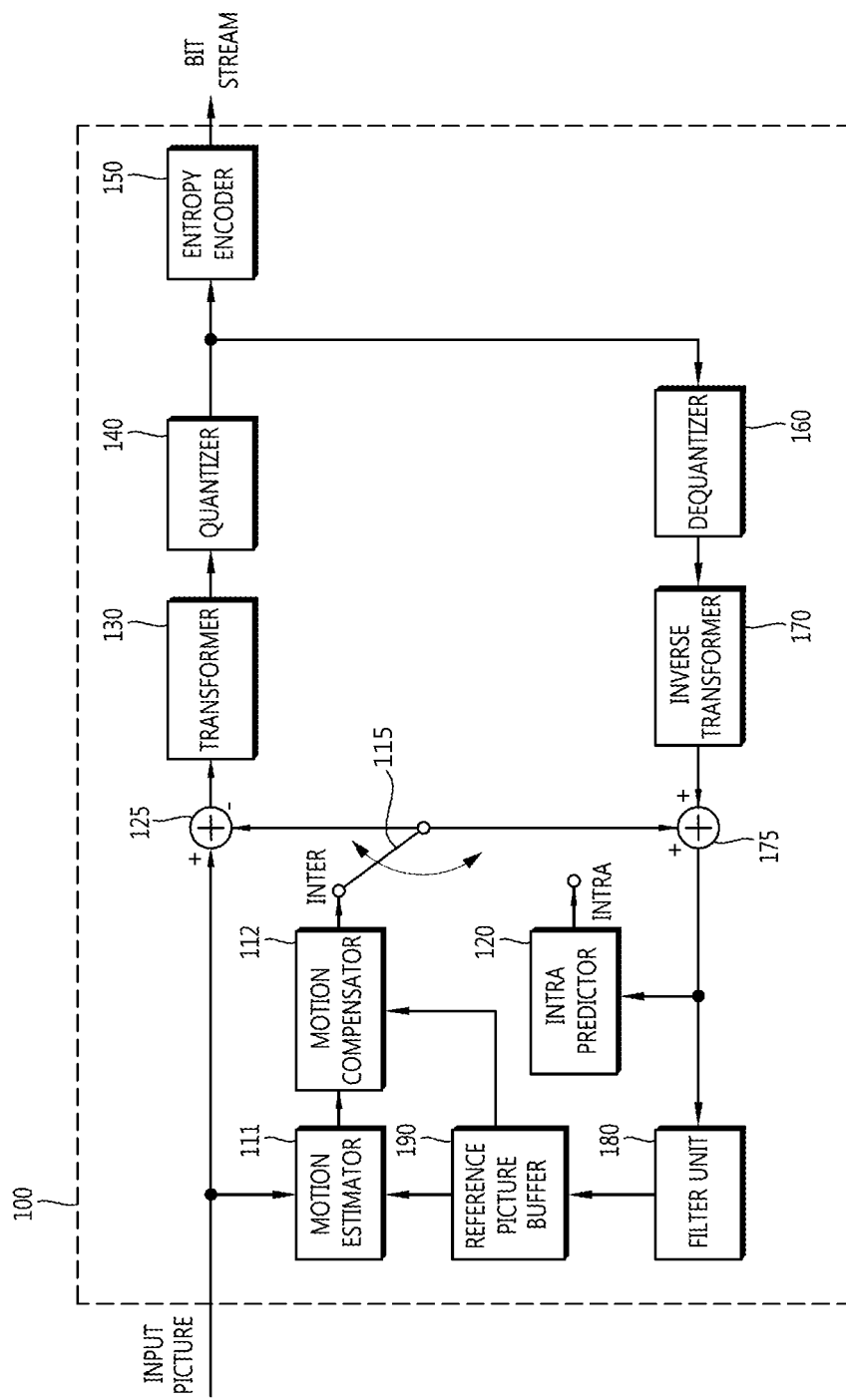
FIG. 1 is a block diagram showing a configuration of an embodiment of an image encoding apparatus according to the present invention.

FIG. 1 is a block diagram showing a configuration of an embodiment of an image encoding apparatus according to the present invention.

Referring to FIG. 1, the image encoding apparatus 100 includes a motion estimator 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The image encoding apparatus 100 may perform encoding on input pictures in an intra-mode or an inter-mode and output bit streams. The intra prediction means intra-frame prediction and the inter prediction means inter-frame prediction. In the case of the intra mode, the switch 115 may be switched to intra, and in the case of the inter mode, the switch 115 may be switched to inter. The image encoding apparatus 100 may generate a prediction block for an input block of the input pictures and then encode a residual between the input block and the prediction block.

In the case of the intra mode, the intra predictor 120 may perform spatial prediction using pixel values of previously encoded blocks neighboring to a current block to generate the prediction block.

In the case of the inter mode, the motion estimator 111 may search a region optimally matched with the input block in a reference picture stored in the reference picture buffer 190 during a motion estimation process to obtain a motion vector. The motion compensator 112 may perform motion compensation using the motion vector to generate the prediction block.

The subtracter 125 may generate a residual block by the residual between the input block and the generated prediction block. The transformer 130 may perform transform on the residual block to output transform coefficients. Further, the quantizer 140 may quantize the input transform coefficient according to quantization parameters to output a quantized coefficient.

The entropy encoding unit 150 may perform entropy encoding according to probability distribution based on values (for example, the quantized coefficient) calculated in the quantizer 140 or encoding parameter values, or the like, calculated during the encoding process to output bit streams.

When the entropy encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the picture encoding may be improved through the entropy encoding. The entropy encoder 150 may use an encoding method such as exponential golomb, context-adaptive variable length coding (CAVLC), context-adaptive binary arithmetic coding (CABAC), or the like, for the entropy encoding.

Since the image encoding apparatus according to the embodiment of FIG. 1 performs inter prediction encoding, that is, inter-frame prediction encoding, a current encoded picture needs to be decoded and stored in order to be used as a reference picture. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The filter unit 180 may also be called an adaptive in-loop filter. The deblocking filter may remove a block distortion and/or a blocking artifact generated at a boundary between blocks. The SAO may add an appropriate offset value to a pixel value in order to compensate an encoding error. The ALF may perform the filtering based on a comparison value between the reconstructed picture and the original picture and may also operate only when a high efficiency is applied. The reconstructed block passing through the filter unit 180 may be stored in the reference picture buffer 190.

Figure 2:
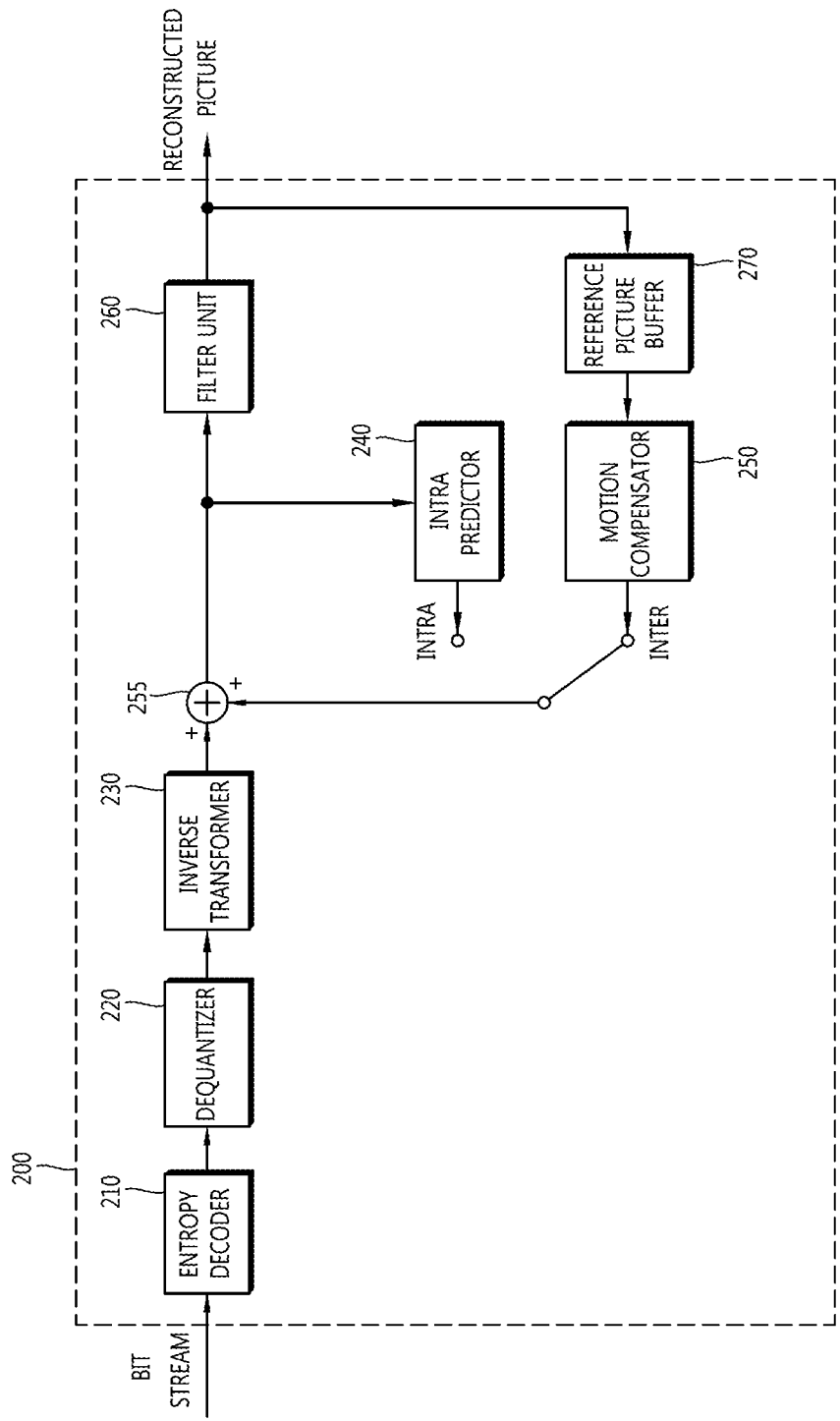
FIG. 2 is a block diagram showing a configuration of an embodiment of an image decoding apparatus according to an embodiment of the present invention.

FIG. 2 is a block diagram showing a configuration of an embodiment of an image decoding apparatus according to the present invention.

Referring to FIG. 2, an image decoding apparatus 200 includes an entropy decoder 210, a dequantizer 220, an inverse transformer 230, an intra predictor 240, a motion compensator 250, an adder 255, a filter unit 260, and a reference picture buffer 270.

The image decoding apparatus 200 may receive the bit streams output from the encoder to perform the decoding in the intra mode or the inter mode and output the reconstructed picture, that is, the reconstructed picture. In the case of the intra mode, the switch may be switched to the intra, and in the case of the inter mode, the switch may be switched to the inter. The image decoding apparatus 200 may obtain a residual block from the received bit streams, generate the prediction block, and then add the residual block to the prediction block to generate the reconstructed block, that is, the reconstructed block.

The entropy decoder 210 may entropy-decode the input bit streams according to the probability distribution to generate symbols including a quantized coefficient type of symbols. The entropy decoding method is similar to the above-mentioned entropy encoding method.

When the entropy decoding method is applied, symbols are represented by allocating a small number of bits to symbols having high generation probability and allocating a large number of bits to symbols having low generation probability, thereby making it possible to reduce a size of bit streams for each symbol. Therefore, the image decoding compression performance may be improved through the entropy decoding method.

The quantized coefficients may be dequantized in the dequantizer 220 and be inversely transformed in the inverse transformer 230. The quantized coefficients are dequantized/inversely transformed, such that the residual block may be generated.

In the case of the intra mode, the intra predictor 240 may perform spatial prediction using pixel values of previously decoded blocks neighboring to a current block to generate prediction blocks. In the case of the inter mode, the motion compensator 250 may perform the motion compensation by using the motion vector and the reference picture stored in the reference picture buffer 270 to generate the prediction block.

The residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed pictures, that is, the reconstructed picture. The reconstructed picture may be stored in the reference picture buffer 270 to thereby be used for the inter prediction.

Hereinafter, the block means a unit of the picture encoding and decoding. At the time of the picture encoding and decoding, the encoding or decoding unit means the divided unit when the picture is divided and then encoded or decoded. Therefore, the unit may be called a coding unit (CU), a prediction unit (PU), a transform unit (TU), a transform block, or the like. One block may be further divided into sub-blocks having a smaller size. In addition, a "picture" in the present specification may be replaced by a "frame", a "field", and/or a "slice" according to a context. These terms may be easily distinguished from each other by those skilled in the art. For example, a P picture, a B picture, and a forward B picture to be described below may be replaced with a P slice, a B slice, and a forward B slice, respectively.

Figure 3:
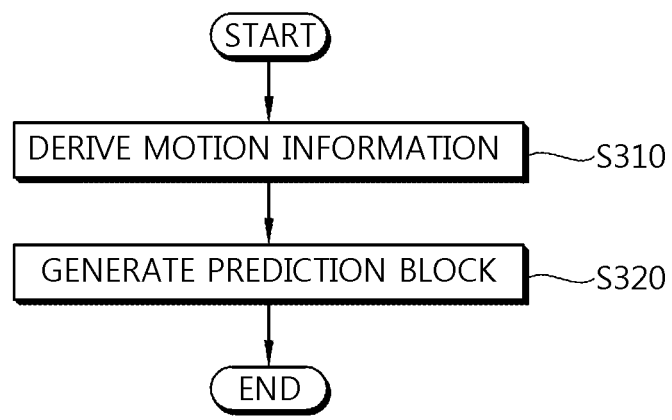
FIG. 3 is a flow chart schematically showing an embodiment of an inter prediction method.

FIG. 3 is a flow chart schematically showing an embodiment of an inter prediction method.

Referring to FIG. 3, an encoder and a decoder may derive motion information on a current block (S310).

In the inter mode, the encoder and the decoder may derive the motion information on the current block and then perform inter prediction and/or motion compensation based on the derived motion information. In this case, the encoder and the decoder use motion information of reconstructed neighboring blocks and/or collocated blocks corresponding to the current block within a previously reconstructed collocated picture, thereby making it possible to improve encoding/decoding efficiency. Here, the reconstructed neighboring block, which is a block in a previously encoded and/or decoded and reconstructed current picture, may include blocks adjacent to the current block and/or blocks positioned at an outer corner of the current block. In addition, the encoder and the decoder may determine a predetermined relative position based on a block present at the spatially same position as that of the current block in the collocated picture and derive the collocated block based on the determined predetermined relative position (positions of an inner portion and/or an outer portion of the block present at the spatially same position as that of the current block). Here, for example, the collocated picture may correspond to one of reference pictures included in a reference picture list.

Meanwhile, a scheme of deriving motion information may be changed according to a prediction mode of the current block. As a prediction mode applied to the inter prediction, there may be an advanced motion vector predictor (AMVP), a merge, or the like.

As an example, in the case in which the AMVP is applied, the encoder and the decoder may generate a prediction motion vector candidate list using a motion vector of the reconstructed neighboring block and/or a motion vector of the collocated block. That is, the motion vector of the reconstructed neighboring block and/or the motion vector of the collocated block may be used as prediction motion vector candidates. The encoder may transmit a prediction motion vector index indicating an optimal prediction motion vector selected among the prediction motion vector candidates included in the list. In this case, the encoder may select the prediction motion vector of the current block among the prediction motion vector candidates included in the prediction motion vector candidate list using the prediction motion vector index.

The encoder may calculate a motion vector difference (MVD) between the motion vector of the current block and the prediction motion vector, encode the calculated MVD, and transmit the encoded MVD to the decoder. In this case, the decoder may decode the received MVD and sum the decoded MVD and the prediction motion vector to derive the motion vector of the current block.

As another example, in the case in which the merge is applied, the encoder and the decoder may generate a merge candidate list using the motion information of the reconstructed neighboring block and/or the motion information of the collocated block. That is, the encoder and the decoder may use the motion information of the reconstructed neighboring block and/or the motion information of the collocated block as merge candidates for the current block in the case in which the motion information of the reconstructed neighboring block and/or the motion information of the collocated block are present.

The encoder may select a merge candidate capable of providing optimal encoding efficiency among the merge candidates included in the merge candidate list as the motion information on the current block. In this case, a merge index indicating the selected merge candidate may be included in the bit stream and then transmitted to the decoder. The decoder may select one of the merge candidates included in the merge candidate list using the transmitted merge index and determine that the selected merge candidate is the motion information of the current block. Therefore, in the case in which the merge is applied, the motion information of the reconstructed neighboring block and/or the motion information of the collocated block may be used as the motion information of the current block as they are.

In the AVMP and the merge modes described above, the motion information of the reconstructed neighboring block and/or the motion information of the collocated block may be used in order to derive the motion information of the current block. Hereinafter, in embodiments to be described below, the motion information derived from the reconstructed neighboring block will be called spatial motion information, and the motion information derived from the collocated block will be called temporal motion information. For example, a motion vector derived from the reconstructed neighboring block may be called a spatial motion vector, and a motion vector derived from the collocated block may be called a temporal motion vector.

Again referring to FIG. 3, the encoder and the decoder may perform motion compensation on the current block based on the derived motion information to generate a prediction block of the current block (S320). Here, the prediction blocks means a motion compensated block generated by performing the motion compensation on the current block. In addition, a plurality of motion compensated blocks may configure one motion compensated picture. Therefore, in embodiments to be described below, the prediction block may be called a 'motion compensated block' and/or a 'motion compensated picture' according to a context. These terms may be easily distinguished from each other by those skilled in the art.

Meanwhile, as a picture on which the inter prediction is performed, there may be a P picture and a B picture. The P picture means a picture on which uni-directional prediction may be performed using one reference picture, and the B picture means a picture on which forward prediction, backward prediction, or bi-directional prediction may be performed using one or more reference picture, for example, two reference pictures. For example, in the B picture, the inter prediction may be performed using one forward reference picture (a past picture) and one backward reference picture (a future picture) Further, in the B picture, the prediction may be performed using two forward reference pictures or be performed using two backward reference pictures.

Here, the reference pictures may be managed by a reference picture list. In the P picture, one reference picture may be used. This reference picture may be allocated to a reference picture list0 (L0 or List0). In the B picture, two reference pictures may be used. These two reference pictures may be allocated to the reference picture list0 and a reference picture list1 (L1 or Lis1), respectively. Hereinafter, an L0 reference picture list may have the same meaning as that of the reference picture list0, and an L1 reference picture list may have the same meaning as that of the reference picture list1.

Generally, the forward reference picture may be allocated to the reference picture list0, and the backward reference picture may be allocated to the reference picture list1. However, a method of allocating a reference picture is not limited thereto. That is, the forward reference picture may be allocated to the reference picture list1, and the backward reference picture may be allocated to the reference picture list0. Hereinafter, the reference picture allocated to the reference picture list0 will be referred to as an L0 reference picture, and the reference picture allocated to the reference picture list1 will be referred to as an L1 reference picture.

The reference pictures may be generally allocated to the reference picture lists in descending order according to reference picture numbers. Here, the reference picture numbers mean numbers allocated to the respective reference pictures in picture order count (POC) order, which means display order and/or time order of the pictures. For example, two reference pictures having the same reference picture number may correspond to the same reference picture. The reference pictures allocated to the reference picture lists may be reordered by a reference picture list reordering (RPLR) or memory management control operation (MMCO) command.

As described above, in the P picture, the uni-direction prediction using one L0 reference picture may be performed, and the B picture, the forward, backward, or bi-directional prediction using one L0 reference picture and one L1 reference picture, that is, two reference pictures may be performed. The prediction using one reference picture may be called uni-prediction, and the prediction using two reference pictures including the L0 reference picture and the L1 reference picture may be called bi-prediction.

Although the bi-directional prediction may be used as a concept including all of the forward prediction, the backward prediction, and the bi-directional prediction, the prediction using two reference pictures (the L0 reference picture and the L1 reference picture) will be called the bi-direction prediction in embodiments to be described below for convenience. That is, in embodiments to be described below, the bi-direction prediction means the bi-prediction and may be understood as a concept including all of the forward prediction, the backward prediction, and the bi-direction prediction using two reference pictures (the L0 reference picture and the L1 reference picture). In addition, even in the case in which the bi-direction prediction is performed, the forward prediction or the backward prediction may be performed. However, in embodiments to be described below, the prediction using only one reference picture will be called the uni-directional prediction for convenience. That is, in embodiments to be described below, the uni-directional prediction means the uni-prediction and may be understood as a concept including only the prediction using one reference picture. Further, hereinafter, information indicating whether the uni-direction prediction (the uni-prediction) or the bi-directional prediction (the bi-prediction) is applied to the block on which the prediction is performed is called prediction direction information.

Figure 4:
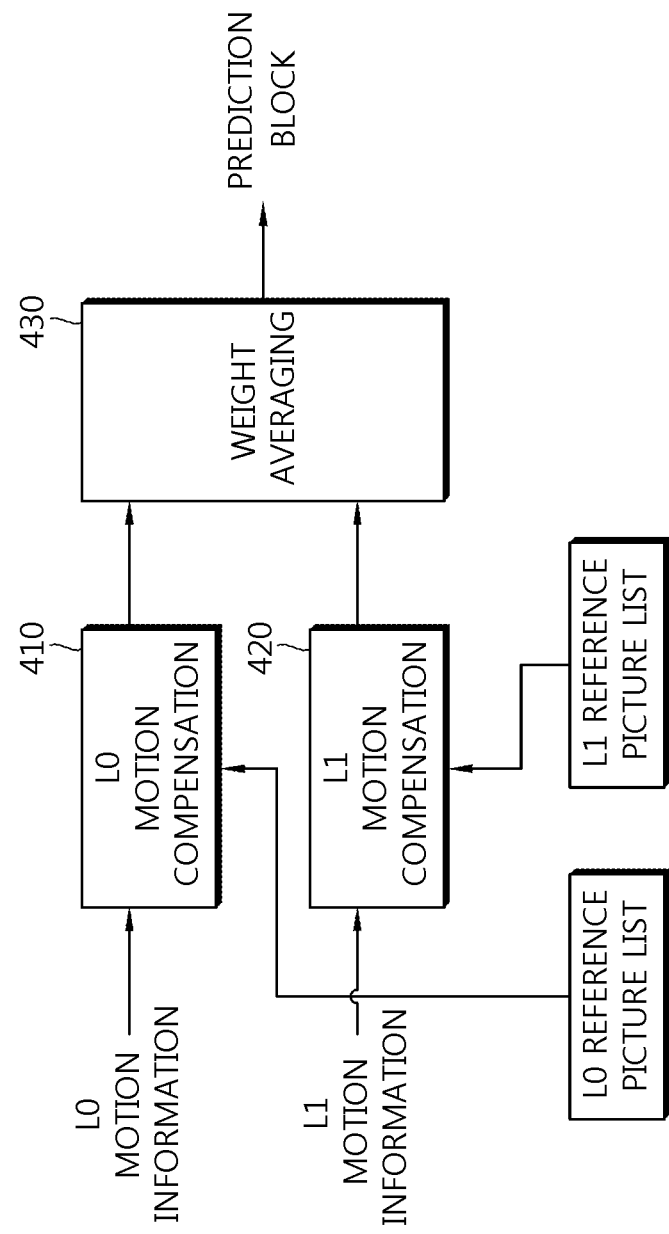
FIG. 4 is a diagram schematically showing an embodiment of an inter prediction method in the case in which bi-direction prediction is applied.

FIG. 4 is a diagram schematically showing an embodiment of an inter prediction method in the case in which bi-direction prediction is applied.

As described above, the encoder and the decoder may perform the bi-directional prediction as well as the uni-directional prediction at the time of the inter prediction. In the case in which the bi-directional prediction is applied, each of the blocks on which the prediction is performed may have two reference pictures (the L0 reference picture and the L1 reference picture). In addition, each of the blocks on which the bi-directional prediction is performed may have two motion information. Here, the motion information may include a reference picture number, a motion vector, and the like.

In the case in which the bi-direction prediction is performed, the encoder and the decoder may select one reference picture in each of the reference picture list0 and the reference picture list1 and use the selected reference pictures for the prediction. That is, two reference pictures including the L0 reference picture and the L1 reference picture may be used for the bi-direction prediction. Hereinafter, motion information corresponding to the L0 reference picture will be called L0 motion information, and motion information corresponding to the L1 reference picture will be called L1 motion information. In addition, motion compensation using the L0 motion information will be called L0 motion compensation, and motion compensation using the L1 motion information will be called L1 motion compensation.

Referring to FIG. 4, the encoder and the decoder may perform the L0 motion compensation 410 for the current block using the L0 motion information and the L0 reference picture list to generate an L0 motion compensated block. In addition, the encoder and the decoder may perform the L1 motion compensation 420 using the L1 motion information and the L1 reference picture list to generate an L1 motion compensated block. Here, the L0 motion compensation 410 and L1 motion compensation 420 processes may be independently performed.

The encoder and the decoder may perform weight averaging 430 of the L0 motion compensated block and the L1 motion compensated block to finally generate one motion compensated block. As an example, the weight averaging 430 may be performed in a pixel unit in the L0 motion compensated block and the L1 motion compensated block. Here, one finally generated motion compensated block may correspond to the prediction block of the current block.

Hereinafter, motion compensation applied at the time of the bi-direction prediction will be called bi-directional motion compensation. Meanwhile, motion compensation applied at the time of the uni-direction prediction will be called uni-directional motion compensation.

Figure 5:
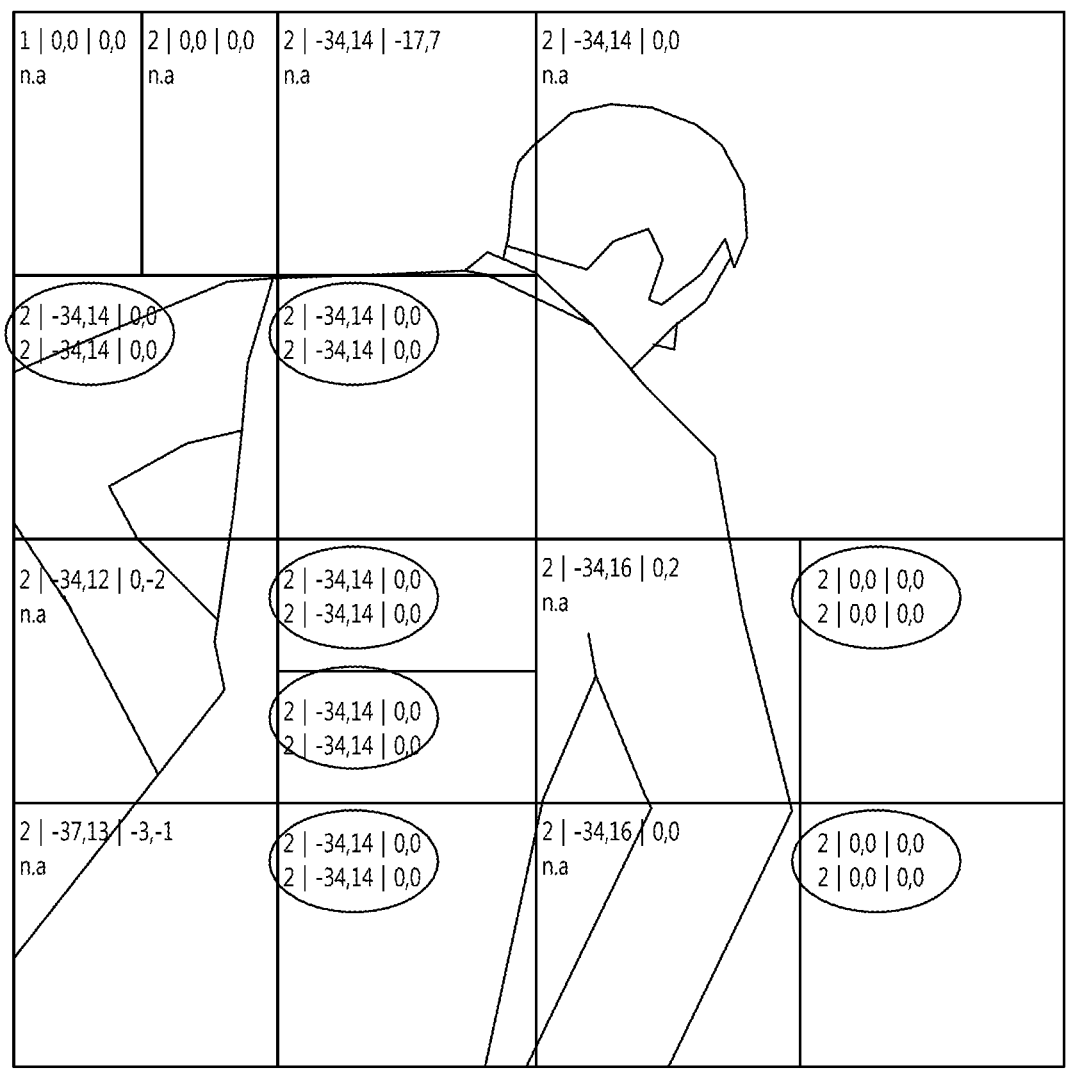
FIG. 5 is a diagram schematically showing an embodiment of motion information of an encoded picture.

FIG. 5 is a diagram schematically showing an embodiment of motion information of an encoded picture. FIG. 5 shows a plurality of blocks configuring the encoded picture and motion information of each of the plurality of blocks.

The encoder and the decoder may use a forward B picture in order to improve inter prediction efficiency in a low delay application environment. Here, the forward B picture means a B picture on which only the forward prediction is performed. In the case in which the forward B picture is used, each of the blocks on which the prediction is performed may have two motion information (the L0 motion information and the L1 motion information). In the forward B picture, the L0 reference picture list and the L1 reference picture may generally be set to be the same as each other. In the following present specification, in the case in which the forward B picture is used, it is assumed that the L0 reference picture list and the L1 reference picture list are the same as each other.

The decoder may directly judge whether or not the current picture is the forward B picture based on the L0 reference picture list and the L1 reference picture or judge whether or not the current picture is the forward B picture based on the information transmitted from the encoder. For example, the encoder may encode a flag indicating whether or not the L0 reference picture list and the L1 reference picture are the same as each other and transmit the encoded flag to the decoder. In this case, the decoder may receive and decode the flag and judge whether the current picture is the forward B picture based on the decoded flag. As another example, the encoder may transmit an NAL unit type value or a slice type value corresponding to the forward B picture to the decoder, and the decoder may receive the NAL unit type value or the slice type value and judge whether or not the current picture is the forward B picture based on NAL unit type value or the slice type value.

The picture shown in FIG. 5 is a picture encoded using the forward B picture. Therefore, each of the blocks in the encoded block may have at most two motion information. Here, the motion information may include a reference picture number, a motion vector, and the like. Referring to FIG. 5, among the blocks having two motion information, there may a plurality of blocks of which the L0 motion information (for example, the reference picture number and the motion vector) and the L1 motion information (for example, the reference picture number and the motion vector) are the same as each other.

In the forward B picture, the blocks of which the L0 motion information (for example, the reference picture number and the motion vector) and the L1 motion information (for example, the reference picture number and the motion vector) are the same as each other may be generated due to a method of deriving temporal motion information. As described above, the temporal motion information may be derived from the motion information of the collocated block corresponding to the current block within the previously reconstructed collocated picture. For example, at the time of deriving the L0 temporal motion information of the current block, the encoder and the decoder may use the L0 motion information of the collocated block corresponding to the current block within the collocated picture. However, in the case in which the L0 motion information is not present in the collocated block, the encoder and the decoder may use the L1 motion information of the collocated block as the L0 temporal motion information of the current block. On the other hand, at the time of deriving the L1 temporal motion information of the current block, the encoder and the decoder may use the L1 motion information of the collocated block corresponding to the current block within the collocated picture. However, in the case in which the L1 motion information is not present in the collocated block, the encoder and the decoder may use the L0 motion information of the collocated block as the L1 temporal motion information of the current block. As a result of performing the above-mentioned process, a phenomenon that the L0 motion information and the L1 motion information of the current block become the same as each other may occur. Therefore, in the present specification, the case in which the L0 motion information (for example, the reference picture number and the motion vector) and the L1 motion information (for example, the reference picture number and the motion vector) are the same as each other and/or the case in which the L0 temporal motion information (for example, the reference picture number and the motion vector) and the L1 temporal motion information (for example, the reference picture number and the motion vector) are the same as each other may include the case in which the motion information of the collocated block corresponding to the current block within the previously reconstructed collocated picture has only one of the L0 motion information and the L1 motion information.

In addition, in the case in which the block of which the L0 motion information and the L1 motion information are the same as each other is generated, this block may have an influence on blocks that are subsequently encoded. For example, in the case in which the merge is applied, the motion information (the L0 motion information and the L1 motion information) of the reconstructed neighboring block and/or the collocated block may be used as the motion information of the current block as it is. Therefore, in the case in which the block of which the L0 motion information and the L1 motion information are the same as each other is generated, more other blocks of which the L0 motion information and the L1 motion information are the same as each other may be generated.

In the case in which the motion compensation is performed on the block of which the L0 motion information and the L1 motion information are the same as each other, the same process may be repeatedly performed twice on one block. This is very inefficient in view of encoding. Therefore, an inter prediction method and/or a motion compensation method capable of reducing computational complexity and improving encoding efficiency by solving the above-mentioned problem may be provided. As an example, in the case in which the L0 motion information (for example, the reference picture number and the motion vector) and the L1 motion information (for example, the reference picture number and the motion vector) are the same as each other, the encoder and the decoder may perform the motion compensation process only once to reduce the computational complexity. As another example, in the case in which the L0 motion information (for example, the reference picture number and the motion vector) and the L1 motion information (for example, the reference picture number and the motion vector) are the same as each other, the encoder and the decoder may also reset the L0 motion information and/or the L1 motion information to increase the encoding efficiency.

Figure 6:
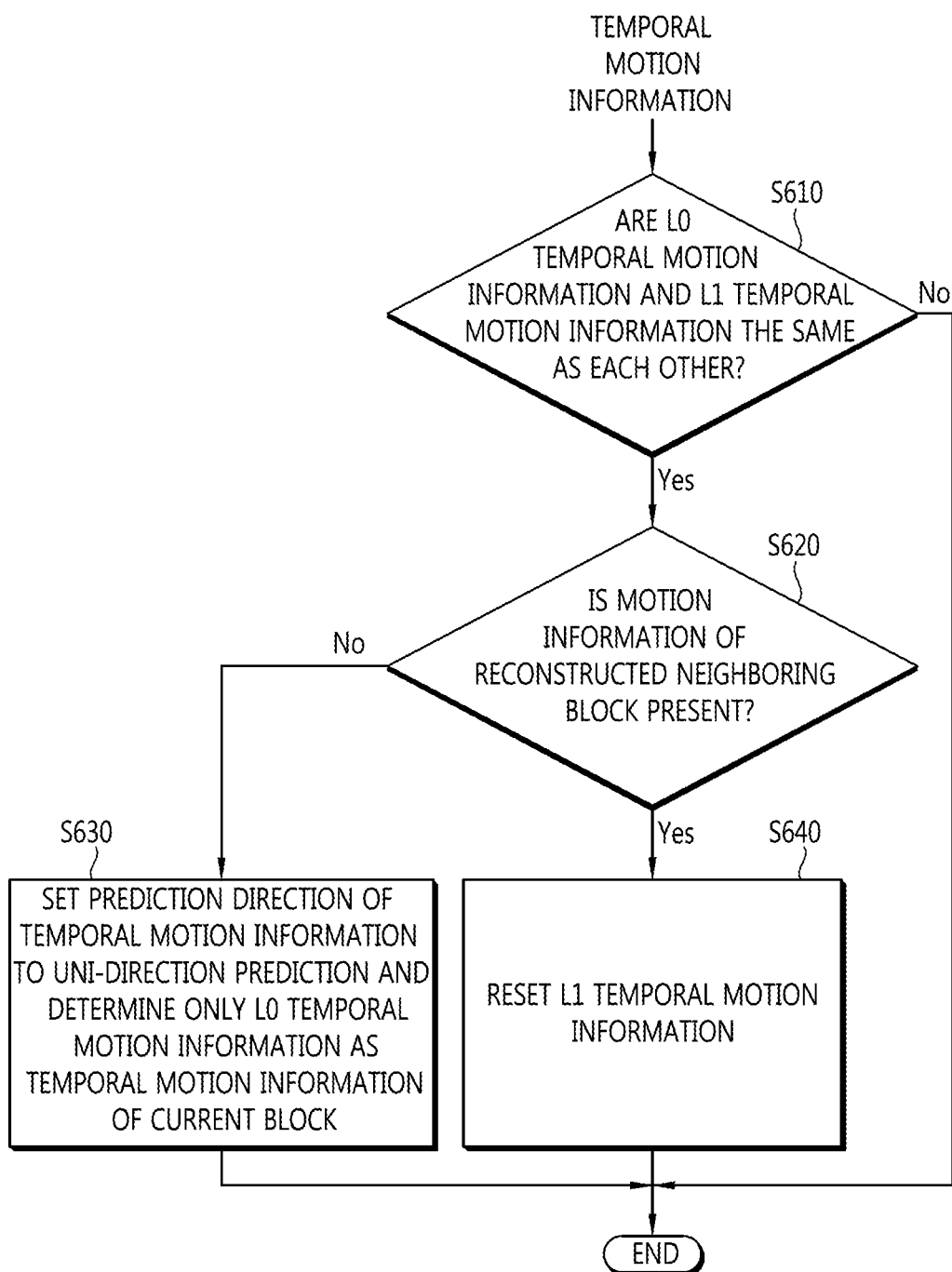
FIG. 6 is a flow chart schematically showing an embodiment of a method of deriving temporal motion information of a current block according to the present invention.

FIG. 6 is a flow chart schematically showing an embodiment of a method of deriving temporal motion information of a current block according to the present invention.

Although embodiments to be described below will be described based on the temporal motion information, the present invention is not limited thereto. For example, the method according to the embodiment of FIG. 6 may be equally or similarly applied to the motion information of the current block derived based on the merge candidate list in the merge mode and/or the motion information of the current block derived based on the prediction motion vector candidate list in the AMVP mode as well as the temporal motion information in the merge mode and/or the AMVP mode.

As described above, the temporal motion information may be derived based on the motion information of the collocated block corresponding to the current block within the previously reconstructed collocated picture. Here, the collocated picture may correspond to one of reference pictures included in a reference picture list as an example. The encoder and the decoder may determine a predetermined relative position based on the block present at the spatially same position as that of the current block in the collocated picture and derive the collocated block based on the determined predetermined relative position (for example, the positions of the inner portion and/or the outer portion of the block present at the spatially same position as that of the current block). The temporal motion information derived based on the collocated block may include prediction direction information, an L0 reference picture number, an L1 reference picture number, an L0 motion vector, an L1 motion vector, and the like.

Referring to FIG. 6, the encoder and the decoder may judge whether or not the L0 temporal motion information and the L1 temporal motion information in the temporal motion information derived based on the collocated block are the same as each other, that is, whether or not the L0 reference picture number and the L1 reference picture number are the same as each other and the L0 motion vector and the L1 motion vector are the same as each other (S610).

In the case in which the L0 temporal motion information and the L1 temporal motion information are not the same as each other, that is, in the case in which the L0 reference picture number and the L1 reference picture number are not the same as each other and/or the L0 motion vector and the L1 motion vector are not the same as each other, the encoder and the decoder may use the temporal motion information derived based on the collocated block as the temporal motion information of the current block as it is. In the case in which the AMVP is applied, the temporal motion information of the current block may be determined or registered to be a prediction motion vector candidate for the current block. Further, in the case in which the merge is applied, the temporal motion information of the current block may be determined or registered to be a merge candidate for the current block.

In the case in which the L0 temporal motion information and the L1 temporal motion information are the same as each other, the encoder and the decoder may judge whether or not the motion information of the reconstructed neighboring block is present (S620). In this case, the encoder and the decoder may judge whether or not the block having the motion information among the reconstructed neighboring blocks positioned at predetermined positions and/or positions selected by a predetermined method is present. Here, the reconstructed neighboring block, which is a block in a previously encoded and/or decoded and reconstructed current picture, may include blocks adjacent to the current block and/or blocks positioned at an outer corner of the current block.

In the case in which the motion information of the reconstructed neighboring block is not present (for example, in the case in which the block having the motion information among the reconstructed neighboring blocks positioned at the predetermined positions and/or the positions selected by predetermined method is not present), the encoder and the decoder may reset the prediction direction information of the current block to the uni-directional prediction (S630). Further, in this case, the encoder and the decoder may use only the L0 temporal motion information as the temporal motion information of the current block.

In the case in which the motion information of the reconstructed neighboring block is present (for example, in the case in which the block having the motion information among the reconstructed neighboring blocks positioned at the predetermined positions and/or the positions selected by the predetermined method is present), the encoder and the decoder may use the motion information of the reconstructed neighboring block as the L1 temporal motion information of the current block (S640). That is, in this case, the encoder and the decoder may reset the L1 temporal motion information of the current block to the motion information of the reconstructed neighboring block. A specific embodiment of the reconstructed neighboring block used to set the L1 temporal motion information will be described below.

Although the method of deriving temporal motion information of a current block has been described based on a flow chart showing a series of steps in the above-mentioned embodiment, one or more step in the flow chart may also be removed. For example, in the above-mentioned embodiment, steps (S620 and S640) may also be omitted. In this case, when the L0 temporal motion information and the L1 temporal motion information are the same as each other, the encoder and the decoder may reset the prediction direction information of the current block to the uni-directional prediction (S630). Further, in this case, the encoder and the decoder may use only the L0 temporal motion information as the temporal motion information of the current block.

Meanwhile, although whether or not processes of S620 to S640 are performed is determined based on the sameness of the L0 temporal motion information and the L1 temporal motion information in the above-mentioned embodiment, the encoder and the decoder may also determine whether or not they perform the processes of S620 to S640 based on other conditions.

As an embodiment, the encoder and the decoder may determine whether or not they perform the processes of S620 to S640 based on the sameness of the L0 reference picture number and the L1 reference picture number in the temporal motion information derived based on the collocated block. As an example, the encoder and the decoder may perform the processes of S620 to S640 in the case in which the L0 reference picture number and the L1 reference picture number are the same as each other.

As another embodiment, the encoder and the decoder may determine whether or not they perform the processes of S620 to S640 based on a prediction direction of the collocated block. As described above, the prediction direction information means information indicating whether the uni-directional prediction or the bi-directional prediction is applied to the block on which the prediction block. Therefore, the prediction direction may correspond to the uni-directional prediction and the bi-directional prediction. As an example, the encoder and the decoder may perform the processes of S620 to S640 in the case in which the motion information (the prediction direction) of the collocated block is the uni-directional prediction rather than the bi-directional prediction. The reason is that in the case in which the prediction direction of the collocated block is the uni-directional prediction, the L0 temporal motion information and the L1 temporal motion information in the temporal motion information derived based on the collocated block may be the same as each other.

As still another embodiment, the encoder and the decoder may determine whether or not they perform the processes of S620 to S640 based on information on whether or not the motion information is present in the collocated block. As an example, the encoder and the decoder may perform the processes of S620 to S640 in the case in which the motion information is not present in the collocated block. In this case, in the above-mentioned step (S640), the L0 temporal motion information rather than the L1 temporal motion information may be reset. That is, the encoder and the decoder may set the L0 temporal motion information to the motion information of the reconstructed neighboring block and perform the uni-directional prediction rather than the bi-directional prediction on the current block. In addition, in the case in which the motion information is not present in the collocated block, in the above-mentioned step (S640), the encoder and the decoder may also reset both of the L0 temporal motion information and the L1 temporal motion information. That is, the encoder and the decoder may set the L0 temporal motion information and the L1 temporal motion information to the motion information of the reconstructed neighboring block and may also perform the bi-directional prediction on the current block.

As still another embodiment, the encoder and the decoder may determine whether or not they perform the processes of S620 to S640 based on a size of the current block. As an example, the encoder and the decoder may judge whether the size of the current block is smaller than a predetermined size. Here, the current block may be the CU, the PU, and/or the TU, and the predetermined size may be one of, for example, 8×8, 16×16, 32×32, and the like. Here, the encoder and the decoder may perform the processes of S620 to S640 in the case in which the size of the current block is smaller than the predetermined size.

As still another embodiment, the encoder and the decoder may also perform the processes of S620 to S640 in the case in which the L0 motion vector and/or the L1 motion vector in the motion information of the collocated block correspond to a zero vector (0,0). In this case, in the above-mentioned step (S640), the encoder and the decoder may reset a motion vector (motion vectors) corresponding to the zero vector (0,0). As an example, the motion vector (motion vectors) corresponding to the zero vector (0,0) may be set to the motion vector of the reconstructed neighboring block. As another example, the motion vector (motion vectors) corresponding to the zero vector (0,0) may also be set to a motion vector of a block positioned around the collocated block. As still another embodiment, the encoder and the decoder may also perform the processes of S620 to S640 in the case in which the L0 motion vector and/or the L1 motion vector in the motion information of the collocated block does not correspond to the zero vector (0,0). In this case, in the above-mentioned step (S640), the encoder and the decoder may reset a motion vector (motion vectors) that does not correspond to the zero vector (0,0). The motion vector (motion vectors) that does not correspond to the zero vector (0,0) may be reset to the motion vector of the reconstructed neighboring block.

A condition for determining whether or not the processes of S620 to S640 are performed is not limited to the above-mentioned embodiments. That is, various conditions may be applied according to a condition and/or a need.

Meanwhile, in the case in which the AMVP is applied, the encoder and/or the decoder may use a candidate having the smallest difference from the motion vector of the current block among the prediction motion vector candidates in the prediction motion vector candidate list as the prediction motion vector of the current block, and in the case in which the merge is applied, the encoder and/or the decoder may use a merge candidate capable of providing optimal encoding efficiency among the merge candidates in the merge candidate list as the prediction information on the current block. Since each of the prediction motion vector candidate list and the merge candidate list may include the temporal motion information and/or the spatial motion information, the motion information (for example, the reference picture number, the motion information, or the like) of the current block may be derived based on the motion information of the reconstructed neighboring block. Therefore, in the above-mentioned step (S640) of resetting L1 temporal motion information, the encoder and the decoder may reset the L1 temporal motion information based on the prediction motion vector candidate list of the current block and/or the merge candidate list of the current block. In this case, the above-mentioned step (S630) of judging whether or not a reconstructed neighboring block is presented may be omitted. Hereinafter, in embodiments to be described below, the motion information candidate list may be understood as a concept including the prediction motion vector candidate list and the merge candidate list.

As described above, the encoder and the decoder may reset the L1 temporal motion information of the current block based on the motion information candidate list of the current block. That is, the encoder and the decoder may use one of the motion information candidates included in the motion information candidate list of the current block as the L1 temporal motion information. The motion information in the motion information candidate list of the current block used as the L1 temporal motion information may be determined by various methods.

As an embodiment, the encoder and the decoder may search the motion information candidates in the motion information candidate list in order from a first motion information candidate up to a final motion information candidate. In this case, the encoder and the decoder may use a first motion information candidate having the same reference picture number as the L1 reference picture number of the L1 temporal motion information derived based on the collocated block as the L1 temporal motion information of the current block. In this case, the encoder and the decoder may use the L0 motion information of the first motion information candidate having the same reference picture number as the L1 reference picture number or use the L1 motion information of the first motion information candidate having the same reference picture number as the L1 reference picture number. Meanwhile, the motion information having the same reference picture number as the L1 reference picture number of the L1 temporal motion information derived based on the collocated block may not be present in the motion information candidate list. In this case, the encoder and the decoder may also add the motion information having the same reference picture number as the L1 reference picture number among the motion information of the reconstructed neighboring block to the motion information candidate list. In this case, the encoder and the decoder may reset the L1 temporal motion information of the current block based on the motion information candidate list to which the motion information of the reconstructed neighboring information is added.

As another embodiment, the encoder and the decoder may use a motion vector of a first motion information candidate having an available motion vector in the motion information candidate list as the L1 temporal motion information of the current block. In this case, the encoder and the decoder may use the L0 motion information of the first motion information candidate or use the L1 motion information of the first motion information candidate.

As still another embodiment, the encoder and the decoder may use a first available motion information candidate in the motion information candidate list as the L1 temporal motion information of the current block. In this case, the L1 reference picture number of the L1 temporal motion information may be changed or set to the reference picture number of the first motion information candidate, and the L1 motion vector of the L1 temporal motion information may be changed or set to the motion vector of the first motion information candidate. In this case, the encoder and the decoder may use the L0 motion information of the first motion information candidate or use the L1 motion information of the first motion information candidate.

The method of determining the motion information candidate used as the L1 temporal motion information in the motion information candidate list of the current block is not limited to the above-mentioned embodiments. That is, various conditions may be applied according to a condition and/or a need.

In the above-mentioned embodiments, available motion information may not be present in the motion information candidate list of the current block. In this case, as an example, the encoder and the decoder may use the motion information of the reconstructed neighboring block as the L1 temporal motion information of the current block as in the above-mentioned step (S640). As another example, in this case, the encoder and the decoder may also add the motion information of the reconstructed neighboring block to the motion information candidate list or add the zero vector (0,0) to the motion information candidate list. In this case, the encoder and the decoder may reset the L1 temporal motion information of the current block based on the motion information candidate list to which the motion information of the reconstructed neighboring information is added or the motion information candidate list to which the zero vector (0,0) is added.

In the above-mentioned embodiments, since the L0 temporal motion information and the L1 temporal motion information are the temporally derived motion information, it is likely that they will correspond to motion information by movement of an object. Therefore, the encoder and the decoder may select the motion information that does not have the zero vector (0,0) rather than the motion information that has the zero vector (0,0) when they search the motion information to be used as the L1 temporal motion information of the current block in the reconstructed neighboring block and/or the motion information candidate list. The reason is that it is likely that the block having the motion information corresponding to the zero vector (0,0) will correspond to a background rather than the object.

Meanwhile, the reset L1 temporal motion information may also be the same as the L0 temporal motion information of the current block. Therefore, the encoder and the decoder may select the motion information that is not the same as the L0 temporal motion information when they search the motion information to be used as the L1 temporal motion information of the current block in the reconstructed neighboring block and/or the motion information candidate list. For example, as in the above-mentioned S640, in the case in which the L1 temporal motion information of the current block is derived based on the reconstructed neighboring block, the encoder and the decoder may determine that a block having motion information different from the L0 temporal motion information of the current block is a block used to derive the L1 temporal motion information. In this case, the encoder and the decoder may also select only motion information having a difference of a predetermined threshold or less from the L0 temporal motion information of the current block as the motion information to be used as the L1 temporal motion information of the current block. Here, the predetermined threshold may be determined based on the mode information of the current block, the motion information of the current block, the mode information of the neighboring block, the motion information of the neighboring block, and the like, and be determined in various schemes.

In addition, in the above-mentioned embodiments, each of the motion information of the reconstructed neighboring block and the motion information selected from the motion information candidate list may include both of the L0 motion information and the L1 motion information. In this case, the encoder and the decoder may determine that one of the L0 motion information and the L1 motion information is the motion information to be used as the L1 temporal motion information of the current block. As an example, the encoder and the decoder may use the L0 motion information in the motion information of the reconstructed neighboring block and/or the motion information selected from the motion information candidate list as the L1 temporal motion information of the current block. In this case, when the L0 motion information is not present in the motion information of the reconstructed neighboring block and the motion information selected from the motion information candidate list, the encoder and the decoder may use the L1 motion information as the L1 temporal motion information of the current block. As another example, the encoder and the decoder may use the L1 motion information in the motion information of the reconstructed neighboring block and the motion information selected from the motion information candidate list as the L1 temporal motion information of the current block. In this case, when the L1 motion information is not present in the motion information of the reconstructed neighboring block and the motion information selected from the motion information candidate list, the encoder and the decoder may use the L0 motion information as the L1 temporal motion information of the current block.

Meanwhile, the encoder and the decoder may not use the motion information of the reconstructed neighboring block and/or the motion information candidate list in order to reset the L1 temporal motion information (for example, the L1 motion vector) of the current block in the above-mentioned step (S640). In this case, the encoder and the decoder may reset the L1 temporal motion information (for example, the L1 motion vector) of the current block based on the L0 temporal motion information (for example, the L0 motion vector) of the current block. Hereinafter, embodiments related to this will be described based on a motion vector.

As an embodiment, the encoder and the decoder may use motion information indicating a relative position moved from a position indicated by the L0 temporal motion information (the L0 motion vector) of the current block based on a predetermined distance and/or direction as the L1 temporal motion information (the L1 motion vector) of the current block. As an example, the encoder and the decoder may use motion information indicating a position moved from a position indicated by the L0 temporal motion information of the current block in a vertical and/or horizontal direction by a ¼ pixel size (for example, (−1,0), (1,0), (0,−1), (0,1), (−1,−1), (−1,1), (1,−1), (1,1), or the like. Here, a ¼ pixel unit corresponds to 1) as the L1 temporal motion information of the current block. As another example, the encoder and the decoder may use motion information indicating a position moved from a position indicated by the L0 temporal motion information of the current block in the vertical and/or horizontal direction by a ½ pixel size (for example, (−2,0), (2,0), (0,−2), (0,2), (−2,−2), (−2,2), (2,−2), (2,2), or the like. Here, a ¼ pixel unit corresponds to 1) as the L1 temporal motion information of the current block. As still another example, the encoder and the decoder may use motion information indicating a position moved from a position indicated by the L0 temporal motion information of the current block in the vertical and/or horizontal direction by an integer pixel size (for example, (−4,0), (4,0), (0,−4), (0,4), (−4,−4), (−4,4), (4,−4), (4,4), or the like. Here, a ¼ pixel unit corresponds to 1) as the L1 temporal motion information of the current block. Meanwhile, since the motion vector includes a vertical direction component and a horizontal direction component, the above-mentioned methods (the movement by the ¼ pixel size, the movement by the ½ pixel size, the movement by the integer pixel size) may also be independently applied to each of the horizontal direction component and the vertical direction component. In this case, a movement distance in the horizontal direction and a movement distance in the vertical direction may also be different from each other.

As another embodiment, the encoder and the decoder may change the L0 temporal motion information (the L0 motion vector) value of the current block into a value of other pixel unit and then use the changed value as the L1 temporal motion information (the L1 motion vector) of the current block. As an example, in the case in which the L0 temporal motion information value of the current block is a value of the ¼ pixel unit, the encoder and the decoder may change the L0 temporal motion information value into a value of a ½ pixel unit based on a shift operation, or the like, and use the changed value as the L1 temporal motion information of the current block. As another example, in the case in which the L0 temporal motion information value of the current block is a value of a ½ pixel unit, the encoder and the decoder may change the L0 temporal motion information value into a value of an integer pixel unit based on the shift operation, or the like, and uses the changed value as the L1 temporal motion information of the current block.

The method of resetting the L1 temporal motion information (for example, the L1 motion vector) of the current block based on the L0 temporal motion information (for example, the L0 motion vector) of the current block is not limited to the above-mentioned embodiments, but may be variously applied in various forms according to an implementation and/or a need.

Meanwhile, in the above-mentioned embodiment, the temporal motion information input to step (S610) before resetting the temporal motion information may include a reference picture index as well as a motion vector. Here, the L0 motion vector and the L1 motion vector may be a motion vector temporally derived based on the collocated block as described above, and the L0 reference picture index and the L1 reference picture index may be a reference picture index spatially derived from the reconstructed neighboring block. Here, the L0 reference picture index and the L1 reference picture index may be set to the non-negative smallest value among the reference picture indices of the reconstructed neighboring block. Meanwhile, as another example, an L0 input reference picture index and an L1 input reference picture index may also be set to 0 regardless of the motion information of the reconstructed neighboring block.

In the case in which the L1 motion vector of the L1 temporal motion information is reset based on the reconstructed neighboring block, a resetting process may also be performed on the L1 reference picture index of the L1 temporal motion information.

Hereinafter, in embodiments of FIGS. 6 to 8 to be described below, for convenience of explanation, the temporal motion information input to step (S610) before resetting the temporal motion information will be called input temporal motion information (L0 input temporal motion information and L1 input temporal motion information). In addition, a motion vector included in the input temporal motion information will be called an input motion vector (an L0 input motion vector and an L1 input motion vector), a reference picture index included in the input temporal motion information will be called an input reference picture index (an L0 input reference picture index and an L1 input reference picture index), and a reference picture number included in the input temporal motion information will be called an input reference picture number (an L0 input reference picture number and an L1 input reference picture number).

As described above, in the case in which the L1 input motion vector is reset, the encoder and the decoder may also perform a resetting process on the L1 input reference picture index. Hereinafter, embodiments of a process of resetting the L1 input reference picture index will be described.

As an example, the encoder and the decoder may reset the L1 input reference picture index based on the reconstructed neighboring block. As described above, the encoder and the decoder may use the motion information of the reconstructed neighboring block as the L1 temporal motion information of the current block. In this case, the encoder and the decoder may reset the L1 input reference picture index to the reference picture index of the reconstructed neighboring block to derive a final L1 reference picture index. As another embodiment, the encoder and the decoder may reset the L1 input reference picture index value to a predetermined fixed reference picture index value to derive a final L1 reference picture index.

As still another embodiment, in the case in which the L0 input temporal motion information (for example, the L0 input motion vector, the L0 input reference picture index, and the like) and L1 input temporal motion information (for example, the L1 input motion vector, the L1 input reference picture index, and the like) are the same as each other, the encoder and the decoder may reset both of the L0 input reference picture index and the L1 input reference picture index to a value of 0 to use the reset value as final temporal motion information. The reason is that in the case in which the L0 input temporal motion information and the L1 input temporal motion information are the same as each other, it is likely that both of the L0 reference picture index and the L1 reference picture index will be 0.

As still another embodiment, the encoder and the decoder may reset the L1 input reference picture index to the same value as that of the L0 input reference picture index. On the other hand, the encoder and the decoder may also reset the L1 input reference picture index value to the reference picture index value that is not the same as that of the L0 input reference picture index. As an example, reference picture indices that are not the same as the L0 input reference picture index among the reference picture indices of the reconstructed neighboring blocks may be present. In this case, for example, the encoder and the decoder may use the most frequently used reference picture index among the reference picture indices that are not the same as the L0 input reference picture index in order to reset the L1 input reference picture index. As another example, the encoder and the decoder may also use the reference picture index having the non-negative smallest value among the reference picture indices that are not the same as the L0 input reference picture index in order to reset the L1 input reference picture index.

Meanwhile, as described above, the encoder and the decoder may reset the L1 input motion vector value in the L1 input temporal motion information to the same value as that of the motion vector of the reconstructed neighboring block to derive a final L1 temporal motion vector. In this case, the motion vector of the reconstructed neighboring block may also be scaled and used according to the L1 input reference picture index and/or the reset L1 reference picture index. The L1 input reference picture index in the L1 input temporal motion information may be used as the final L1 temporal motion information as it is without being subjected to the resetting process or be subjected to the resetting processes and then used as the final L1 temporal motion information as in the above-mentioned embodiment. Here, a reference picture corresponding to the motion vector of the reconstructed neighboring block and a reference picture indicated by the final L1 reference picture index may be different from each other. In this case, the encoder and the decoder may perform scaling on the motion vector of the reconstructed neighboring block and use the scaled motion vector as the final L1 temporal motion information of the current block.

The above-mentioned embodiments may be combined with each other by various methods according to the process of resetting the motion vector and the process of resetting the reference picture index (for example, RefIdxLX, X=0,1). Hereinafter, in embodiments to be described below, it is assumed that the L1 input motion vector is reset based on the reconstructed neighboring block. That is, it is assumed that the encoder and the decoder reset the L1 input motion vector to one of the motion vectors of the reconstructed neighboring blocks.

As an embodiment, the encoder and the decoder may use only the motion vector rather than the zero vector among the motion vectors of the reconstructed neighboring blocks in order to reset the L1 input motion vector. In this case, as an example, the L1 input reference picture index may be used as the final L1 temporal motion information as it is without being subjected to the resetting process. As another example, the L1 input reference picture index value may be reset to the reference picture index value of the reconstructed neighboring block, and the reset reference picture index may be used as the final L1 temporal motion information. As another example, the L1 input reference picture index value may also be reset to a predetermined fixed reference picture index value. Since specific embodiments of each of them have been described above, a description thereof will be omitted.

As another embodiment, the encoder and the decoder may scale and use the motion vector of the reconstructed neighboring block in order to reset the L1 input motion vector. In this case, the scaled motion vector may be used as the final L1 temporal motion information. In this case, as an example, the L1 input reference picture index may be used as the final L1 temporal motion information as it is without being subjected to the resetting process. As another example, the L1 input reference picture index value may be reset to the reference picture index value of the reconstructed neighboring block, and the reset reference picture index may be used as the final L1 temporal motion information. As another example, the L1 input reference picture index value may also be reset to a predetermined fixed reference picture index value. Since specific embodiments of each of them have been described above, a description thereof will be omitted.

As still another embodiment, the encoder and the decoder may use only the motion vector having a difference of a predetermined threshold or less from the L0 temporal motion information (the L0 motion vector) of the current block among the motion vectors of the reconstructed neighboring blocks in order to reset the L1 input motion vector. In this case, the encoder and the decoder may also use only the motion vector that is not the same as the L0 temporal motion information (the L0 motion vector) of the current block among the motion vectors of the reconstructed neighboring blocks. In this case, as an example, the L1 input reference picture index may be used as the final L1 temporal motion information as it is without being subjected to the resetting process. As another example, the L1 input reference picture index value may be reset to the reference picture index value of the reconstructed neighboring block, and the reset reference picture index may be used as the final L1 temporal motion information. As another example, the L1 input reference picture index value may also be reset to a predetermined fixed reference picture index value. Since specific embodiments of each of them have been described above, a description thereof will be omitted.

A combination of the embodiments of the process of resetting the motion vector and the process of resetting the reference picture index is not limited to the above-mentioned embodiment, but may be provided in various forms according to an implementation and/or a need.

Meanwhile, as described above, the reset L1 temporal motion information may be the same as the L0 temporal motion information of the current block. Therefore, when the reset L1 temporal motion information is the same as the L0 temporal motion information of the current block, the encoder and the decoder may reset the prediction direction information of the current block to the uni-directional prediction. In this case, the encoder and the decoder may use only the L0 temporal motion information as the temporal motion information of the current block. This method, which is a combination with the above-mentioned embodiments, may be applied to the present invention.

Figure 7:
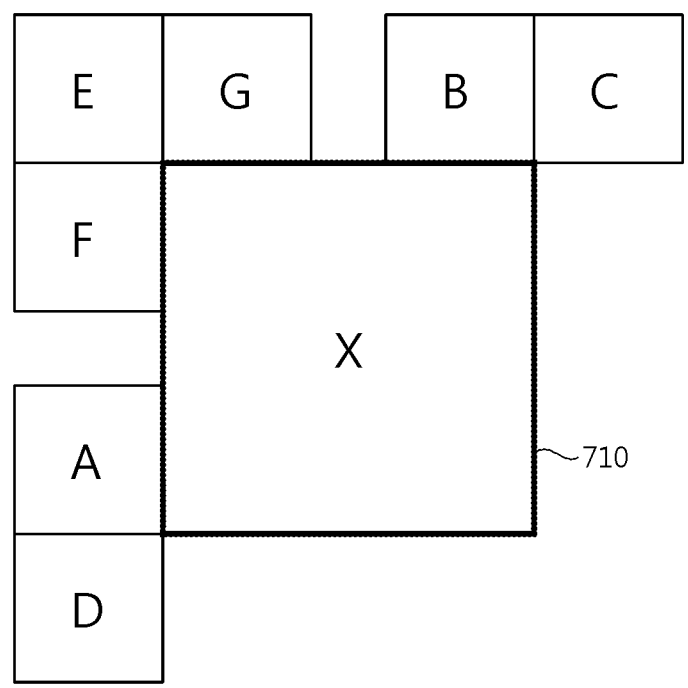
FIG. 7 is a diagram schematically showing an embodiment of reconstructed neighboring blocks used to reset L1 temporal motion information.

FIG. 7 is a diagram schematically showing an embodiment of reconstructed neighboring blocks used to reset L1 temporal motion information. In FIG. 7, a block 710 indicates a current block X.

As described above, the reconstructed neighboring block, which is a block in a previously encoded and/or decoded and reconstructed current picture, may include blocks adjacent to the current block 710 and/or blocks positioned at an outer corner of the current block 710. In the embodiment of FIG. 7, a block positioned at a left lower corner of an outer portion of the current block 710 is called a left lower corner block A, a block positioned at a left upper corner of the outer portion of the current block 710 is called a left upper corner block E, and a block positioned at a right upper corner of the outer portion of the current block 710 is called a right upper corner block C. In addition, a block positioned at the uppermost portion among blocks adjacent to the left of the current block 710 is called a left uppermost block F, a block positioned at the lowermost portion among the blocks adjacent to the left of the current block 710 is called a left lowermost block A, a block positioned at the leftmost portion among blocks adjacent to an upper portion of the current block 710 is called an upper leftmost block G, and a block positioned at the rightmost portion among the blocks adjacent to the upper portion of the current block 710 is called an upper rightmost block B.

As described above in the embodiment of FIG. 6, the encoder and the decoder may use the motion information of the reconstructed neighboring block as the L1 temporal motion information of the current block according to a predetermined condition. That is, the encoder and the decoder may reset the L1 temporal motion information value of the current block to the motion information value of the reconstructed neighboring block. Here, the motion information used as the L1 temporal motion information of the current block may be derived by various methods.

As an embodiment, the encoder and the decoder may derive the motion information used as the L1 temporal motion information from one block present at a predetermined position among the reconstructed neighboring blocks. In this case, the block present at the predetermined position may correspond to one of the left lowermost block A, the upper rightmost block B, the right upper corner block C, the left lower corner block D, the left upper corner block E, the left uppermost block F, and the upper leftmost block G.

As another embodiment, the encoder and the decoder may scan a plurality of blocks present at the predetermined positions among the reconstructed neighboring blocks in a predetermined order. In this case, the encoder and the decoder may use motion information of a first block in which the motion information is present in scan order as the L1 temporal motion information of the current block. A scan target block and a scan order may be determined in various forms. As an example, the encoder and the decoder may scan the neighboring blocks in order of the left uppermost block F, the upper leftmost block G, and the upper rightmost block B. As another example, the encoder and the decoder may also scan the neighboring blocks in order of the left uppermost block F, the upper leftmost block G, the right upper corner block C, the left lower corner block D, and the left upper corner block E. As still another example, the encoder and the decoder may scan the neighboring blocks in order of the left lowermost block A, the upper rightmost block B, and the left upper corner block E. As still another example, the encoder and the decoder may also scan the neighboring blocks in order of the left lowermost block A, the upper rightmost block B, the right upper corner block C, the left lower corner block D, and the left upper corner block E. As still another example, the encoder and the decoder may also scan the neighboring blocks in order of the left lowermost block A, the upper rightmost block B, the right upper corner block C, the left lower corner block D, the left upper corner block E, the left uppermost block F, and the upper leftmost block G.

As still another embodiment, the encoder and the decoder may derive an intermediate value of the motion information of the plurality of blocks present at the predetermined positions among the reconstructed neighboring blocks and use the derived intermediate value as the L1 temporal motion information of the current block. For example, the plurality of blocks may be the left uppermost block F, the upper leftmost block G, the right upper corner block C, the left lower corner block D, and the left upper corner block E.

The method of deriving the L1 temporal motion information of the current block from the reconstructed neighboring block is not limited thereto. That is, the L1 temporal motion information of the current block may be derived by various methods according to an implementation and/or a need.

Hereinafter, an embodiment of a process of deriving temporal motion information according to the embodiments of FIGS. 6 and 7 will be described in view of the decoder.

An inputs for the process of deriving temporal motion information may include a position (xP, yP) of the leftmost upper sample of the current block, an input motion vector mvLXCol), an input reference picture number (RefPicOrder (currPic, refIdxLX, LX)), and the like. Here, currPic means the current picture. An outpour of the process may be a motion vector (mvLXCol) used as the final temporal motion information and information (availableFlagLXCol) indicating whether or not the final temporal motion information is present. Here, X may have a value of 0 or 1. For example, in the case in which X is 0, mvLXCol, refIdxLX, and LX may be mvL0Col, refIdxL0, and L0, respectively, which mean variables associated with the L0 temporal motion information. In addition, mvLX means a motion vector, mvLX[0] means an x component motion vector, and mvLX [1] means a y component motion vector. refIdxLX means an LX reference picture index indicating a reference picture in an LX reference picture list in which reference pictures are stored. In the case in which a value of refIdxLX is 0, refIdxLX may indicate a first reference picture in the LX reference picture list, and the case in which a value of refIdxLX is −1, refIdxLX may indicate that a reference picture is not present in the reference picture list. In addition, predFlagLX to be described below may indicate whether or not motion compensation is performed at the time of generation of a prediction block. For example, in the case in which a value of predFlagLX is 1, the encoder and the decoder may perform the motion compensation at the time of the generation of the prediction block.

When the input motion vector mvL0Col and mvL1Col are the same as each other and RefPicOrder (currPic, refIdxL0, L0) and RefPicOrder (currPic, refIdxL1, L1) are the same as each other (that is, when the L0 reference picture number and the L1 reference picture number are the same as each other), the encoder and the decoder may perform the following process.

When the left uppermost block A (xP−1, yP) adjacent to the left of the current block is present and is not a block encoded in the intra mode, predFlagL0A is '1', and mvL0A is not (0,0), the encoder and the decoder may perform the following process. Here, A may indicate that predFlagL0A and mvL0A are information on the left uppermost block A.

mvL1Col=mvL1L0A

On the other hand, when the upper leftmost block B (xP, yP−1) adjacent to the upper portion of the current block is present and is not the block encoded in the intra mode, predFlagL0B is '1', and mvL0B is not (0,0), the encoder and the decoder may perform the following process. Here, B may indicate that predFlagL0B and mvL0B are information on the upper leftmost block B.

mvL1Col=mvL0B

On the other hand, when the left upper corner block E (xP−1, yP−1) positioned at the left upper corner of the outer portion of the current block is present and is not the block encoded in the intra mode, predFlagL0E is '1', and mvL0E is not (0,0), the encoder and the decoder may perform the following process. Here, E may indicate that predFlagL0E and mvL0E are information on the left upper corner block E.

mvL1Col=mvL0E

Here, when mvL0Col and mvL1Col are the same as each other, the encoder and the decoder may perform the following process.

avilableFlagL1Col=0

In addition, the encoder and the decoder may perform the following process.

availableFlagCol=availableFlagL0Col∥availableFlagL1Col
predFlagLXCol=availableFlagLXCol Here, availableFlagCol may indicate whether or not the temporal motion information is derived, predFlagLXCol may indicate whether or not the final temporal motion information is present for each of the L0 temporal motion information and the L1 temporal motion information.

Figure 8:
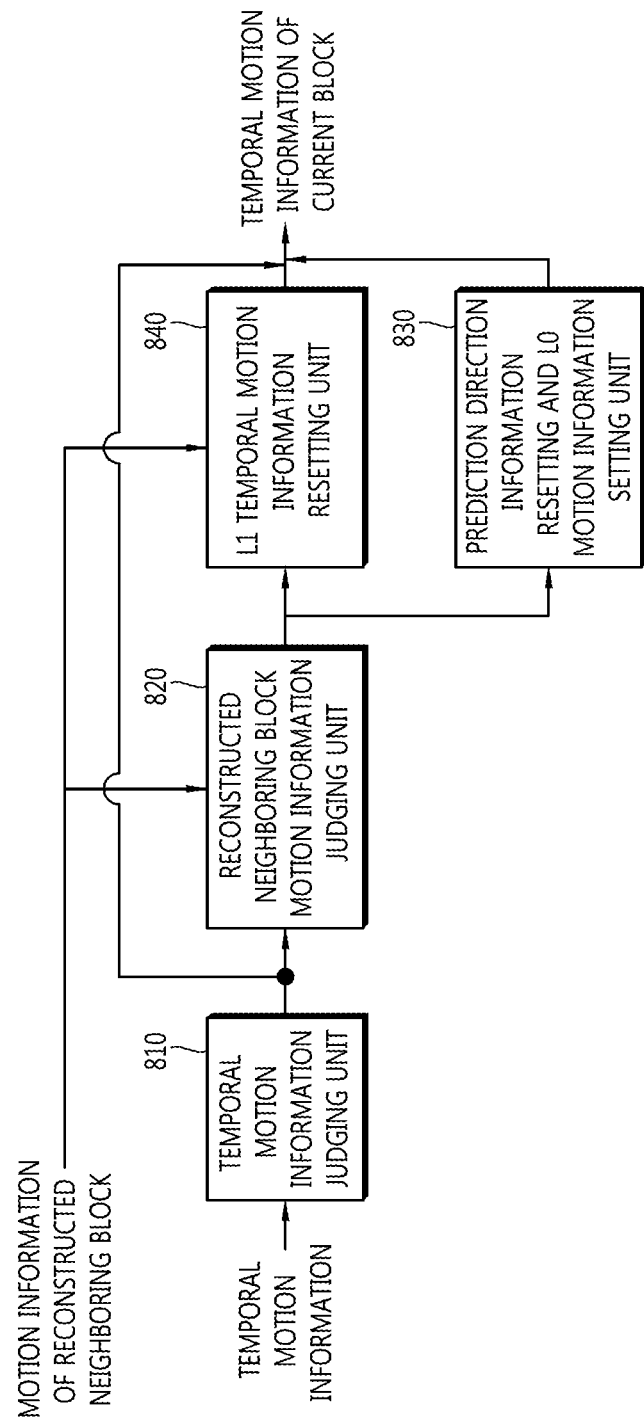
FIG. 8 is a block diagram schematically showing an embodiment of an inter prediction apparatus capable of performing the process of deriving temporal motion information according to the embodiment of FIG. 6.

FIG. 8 is a block diagram schematically showing an embodiment of an inter prediction apparatus capable of performing the process of deriving temporal motion information according to the embodiment of FIG. 6. The inter prediction apparatus according to the embodiment of FIG. 8 may include a temporal motion information judging unit 810, a reconstructed neighboring block motion information judging unit 820, a prediction direction information resetting and L0 motion information setting unit 830, and an L1 temporal motion information resetting unit 840.

Referring to FIG. 8, the temporal motion information judging unit 810 may judge whether or not the L0 temporal motion information and the L1 temporal motion information in the input temporal motion information are the same as each other, that is, whether or not the L0 reference picture number and the L1 reference picture number are the same as each other and the L0 motion vector and the L1 motion vector are the same as each other.

In the case in which the L0 temporal motion information and the L1 temporal motion information are not the same as each other, the inter prediction apparatus may use the input temporal motion information as the temporal motion information of the current block as it is. In the case in which the AMVP is applied, the temporal motion information of the current block may be determined or registered to be a prediction motion vector candidate for the current block. Further, in the case in which the merge is applied, the temporal motion information of the current block may be determined or registered to be a merge candidate for the current block. In the case in which the L0 temporal motion information and the L1 temporal motion information are the same as each other, a judging process by the reconstructed neighboring block motion information judging unit 820 may be performed.

Meanwhile, as described above with reference to FIG. 6, the temporal motion information judging unit 810 may also judge whether or not the L0 reference picture number and the L1 reference picture number are the same as each other rather than whether or not the L0 temporal motion information and the L1 temporal motion information are the same as each other or a prediction direction of the collocated block. For example, in the case in which the L0 reference picture number and the L1 reference picture number are not the same as each other, the inter prediction apparatus may use the input temporal motion information as the temporal motion information of the current block as it is, and in the case in which the L0 reference picture number and the L1 reference picture number are the same as each other, the judging process by the reconstructed neighboring block motion information judging unit 820 may be performed. As another example, in the case in which the prediction direction of the collocated block is the bi-directional prediction, the inter prediction apparatus may use the input temporal motion information as the temporal motion information of the current block as it is, and in the case in which the prediction direction of the collocated block is the uni-directional prediction, the judging process by the reconstructed neighboring block motion information judging unit 820 may be performed.

The reconstructed neighboring block motion information judging unit 820 may judge whether or not the motion information of the reconstructed neighboring block is present. In the case in which the motion information of the reconstructed neighboring block is not present (for example, in the case in which the block having the motion information among the reconstructed neighboring blocks positioned at predetermined positions and/or positions selected by a pre-determined method is not present), a prediction direction information resetting and L0 motion information setting process by the prediction direction information resetting and L0 motion information setting unit 830 may be performed. Further, in the case in which the motion information of the reconstructed neighboring block is present (for example, in the case in which the block having the motion information among the reconstructed neighboring blocks positioned at the predetermined positions and/or the positions selected by the predetermined method is present), a resetting process may by the L1 temporal motion information resetting unit 840 be performed.

In the case in which the motion information of the reconstructed neighboring block is not present, the prediction direction information resetting and L0 motion information setting unit 830 may reset the prediction direction information of the current block to the unit-directional perdition. In addition, in this case, the prediction direction information resetting and L0 motion information setting unit 830 may set only the L0 temporal motion information among the input temporal motion information to the final temporal motion information of the current block.

In the case in which the motion information of the reconstructed neighboring block is present, the L1 temporal motion information resetting unit 840 may reset the L1 temporal motion information of the current block to the motion information of the reconstructed neighboring block. That is, the inter prediction apparatus may use the motion information of the reconstructed neighboring block as the L1 temporal motion information of the current block. In this case, as an example, the L1 temporal motion information resetting unit 840 may select only the motion information that does not have the zero vector (0,0) rather than the motion information that has the zero vector (0,0) when it searches the motion information to be used as the L1 temporal motion information of the current block in the reconstructed neighboring block. Meanwhile, the L1 temporal motion information resetting unit 840 may also reset the L1 temporal motion information of the current block based on the motion information candidate list of the current block. Since specific embodiments of each of the above-mentioned methods have been described with reference to FIGS. 6 and 7, a description thereof will be omitted.

Figure 9:
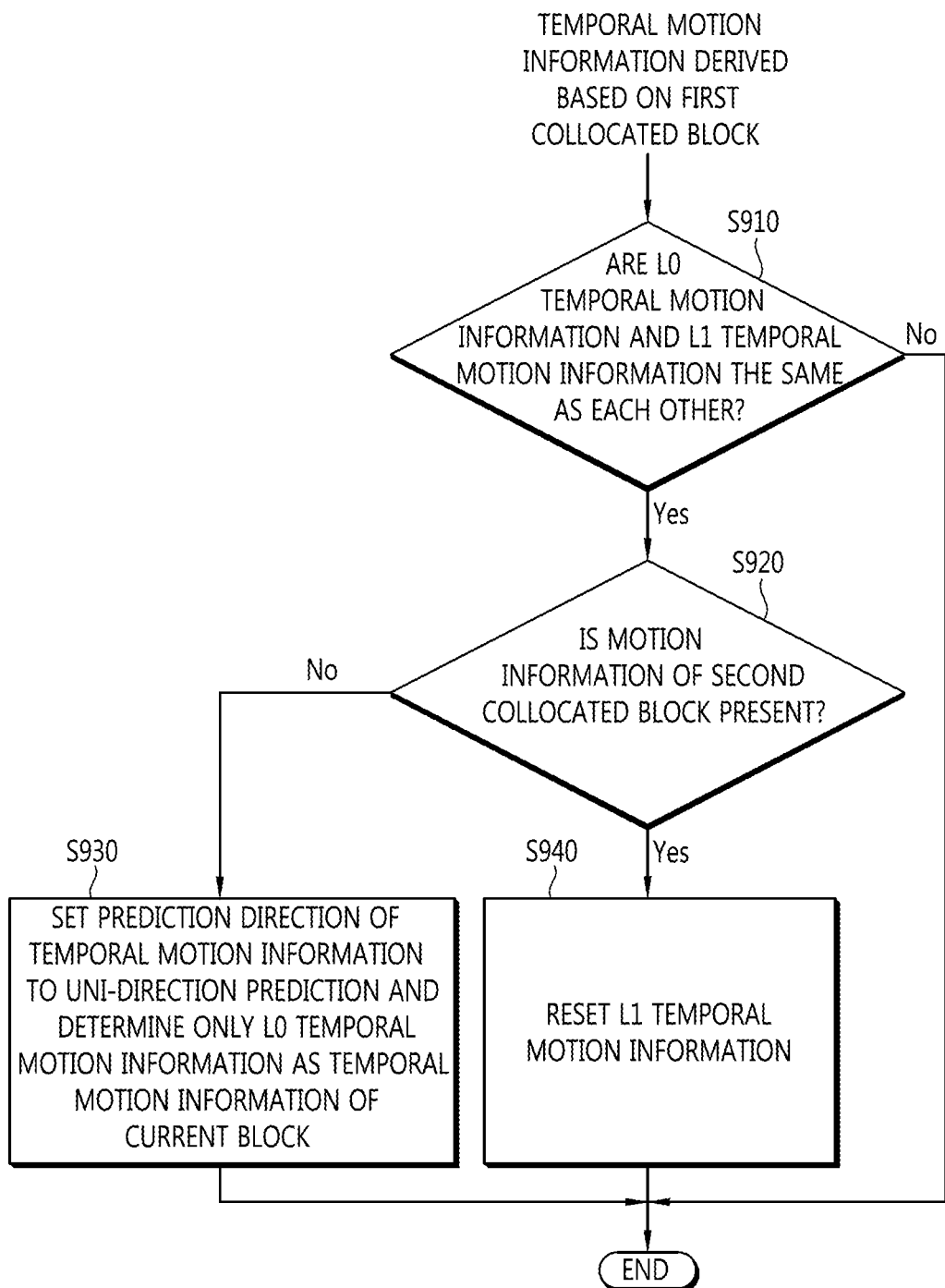
FIG. 9 is a flow chart schematically showing another embodiment of a method of deriving temporal motion information of a current block according to the present invention.

FIG. 9 is a flow chart schematically showing another embodiment of a method of deriving temporal motion information of a current block according to the present invention.

Although embodiments to be described below will be described based on the temporal motion information, the present invention is not limited thereto. For example, the method according to the embodiment of FIG. 9 may be equally or similarly applied to the motion information of the current block derived based on the merge candidate list in the merge mode and/or the motion information of the current block derived based on the prediction motion vector candidate list in the AMVP mode as well as the temporal motion information in the merge mode and/or the AMVP mode.

As described above, the temporal motion information may be derived based on the motion information of the collocated block corresponding to the current block within the previously reconstructed collocated picture. Here, the collocated picture may correspond to one of reference pictures included in a reference picture list as an example. The encoder and the decoder may determine a predetermined relative position based on the block present at the spatially same position as that of the current block in the collocated picture and derive the collocated block based on the determined predetermined relative position (for example, the positions of the inner portion and/or the outer portion of the block present at the spatially same position as that of the current block). The temporal motion information derived based on the collocated block may include prediction direction information, an L0 reference picture number, an L1 reference picture number, an L0 motion vector, an L1 motion vector, and the like.

Referring to FIG. 9, the encoder and the decoder may judge whether or not the L0 temporal motion information and the L1 temporal motion information in the temporal motion information derived based on the collocated block are the same as each other, that is, whether or not the L0 reference picture number and the L1 reference picture number are the same as each other and the L0 motion vector and the L1 motion vector are the same as each other (S910). Hereinafter, in embodiments of FIGS. 9 to 11 to be described below, for convenience of explanation, the temporal motion information input to step (S910) before resetting the temporal motion information will be called input temporal motion information (L0 input temporal motion information and L1 input temporal motion information). In addition, a motion vector included in the input temporal motion information will be called an input motion vector (an L0 input motion vector and an L1 input motion vector), a reference picture index included in the input temporal motion information will be called an input reference picture index (an L0 input reference picture index and an L1 input reference picture index), and a reference picture number included in the input temporal motion information will be called an input reference picture number (an L0 input reference picture number and an L1 input reference picture number).

In the case in which the L0 input temporal motion information and the L1 input temporal motion information are not the same as each other, that is, in the case in which the L0 input reference picture number and the L1 input reference picture number are not the same as each other and/or the L0 input motion vector and the L1 input motion vector are not the same as each other, the encoder and the decoder may use the input temporal motion information derived based on the collocated block as the temporal motion information of the current block as it is. In the case in which the AMVP is applied, the temporal motion information of the current block may be determined or registered to be a prediction motion vector candidate for the current block. Further, in the case in which the merge is applied, the temporal motion information of the current block may be determined or registered to be a merge candidate for the current block.

In the case in which the L0 input temporal motion information and the L1 input temporal motion information are the same as each other, the encoder and the decoder may judge whether or not the motion information of the collocated block is present (S920). Here, the collocated block may be a newly derived collocated block rather than the collocated block used to derive the input temporal motion information. For example, the encoder and the decoder may judge whether or not the block having the motion information among the collocated blocks positioned at predetermined positions and/or positions selected by a predetermined method is present.

Hereinafter, in embodiments of FIGS. 9 to 11, for convenience of explanation, a collocated block used to derive the input temporal motion information will be called a first collocated block, and a collocated block used to reset the L1 input temporal motion information as shown in step (S940) while being a judgment target regarding whether or not motion information is present as shown in step (S920) will be called a second collocated block. A collocated picture including the first collocated block will be called a first collocated picture, and a collocated picture including the second collocated block will be called a second collocated picture. Here, as an example, each of the first and second collocated pictures may correspond to one of the reference pictures included in the reference picture list.

In the case in which the motion information of the second collocated block is not present (for example, in the case in which the block having the motion information among the second collocated blocks positioned at the predetermined positions and/or the positions selected by the predetermined method is not present), the encoder and the decoder may reset the prediction direction information of the current block to the uni-directional prediction (S930). Further, in this case, the encoder and the decoder may use only the L0 input temporal motion information as the temporal motion information of the current block.

In the case in which the motion information of the second collocated block is present (for example, in the case in which the block having the motion information among the second collocated blocks positioned at the predetermined positions and/or the positions selected by the predetermined method is present), the encoder and the decoder may use the motion information of the second collocated block as the final L1 temporal motion information of the current block (S940). That is, in this case, the encoder and the decoder may reset the L1 input temporal motion information of the current block to the motion information of the second collocated block. Specific embodiments of the second collocated picture and the second collocated block used to reset the L1 input temporal motion information will be described below.

Although the method of deriving temporal motion information of a current block has been described based on a flow chart showing a series of steps in the above-mentioned embodiment, one or more step in the flow chart may also be removed. For example, in the above-mentioned embodiment, steps (S920 and S940) may also be omitted. In this case, when the L0 input temporal motion information and the L1 input temporal motion information are the same as each other, the encoder and the decoder may reset the prediction direction information of the current block to the uni-directional prediction (S930). Further, in this case, the encoder and the decoder may use only the L0 input temporal motion information as the final temporal motion information of the current block.

Meanwhile, although whether or not processes of S920 to S940 are performed is determined based on the sameness of the L0 input temporal motion information and the L1 input temporal motion information in the above-mentioned embodiment, the encoder and the decoder may also determine whether or not they perform the processes of S920 to S940 based on other conditions.

As an embodiment, the encoder and the decoder may determine whether they perform the processes of S920 to S940 based on the sameness of the L0 input reference picture number and the L1 input reference picture number. As an example, the encoder and the decoder may perform the processes of S920 to S940 in the case in which the L0 input reference picture number and the L1 input reference picture number are the same as each other.

As another embodiment, the encoder and the decoder may determine whether or not they perform the processes of S920 to S940 based on a prediction direction of the first collocated block. As described above, the prediction direction information means information indicating whether the uni-directional prediction or the bi-directional prediction is applied to the block on which the prediction block. Therefore, the prediction direction may correspond to the uni-directional prediction and the bi-directional prediction. As an example, the encoder and the decoder may perform the processes of S920 to S940 in the case in which the motion information (the prediction direction) of the first collocated block is the uni-directional prediction rather than the bi-directional prediction. The reason is that in the case in which the prediction direction of the first collocated block is the uni-directional prediction, the L0 input temporal motion information and the L1 input temporal motion information in the input temporal motion information derived from the collocated block may be the same as each other.

As still another embodiment, the encoder and the decoder may determine whether or not they perform the processes of S920 to S940 based on information on whether or not the motion information is present in the first collocated block. As an example, the encoder and the decoder may perform the processes of S920 to S940 in the case in which the motion information is not present in the first collocated block. In this case, in the above-mentioned step (S940), the L0 input temporal motion information rather than the L1 input temporal motion information may be reset. That is, the encoder and the decoder may set the L0 input temporal motion information to the motion information of the second collocated block and perform the uni-directional prediction rather than the bi-directional prediction on the current block. In addition, in the case in which the motion information is not present in the first collocated block, in the above-mentioned step (S940), the encoder and the decoder may also reset both of the L0 input temporal motion information and the L1 input temporal motion information. That is, the encoder and the decoder may reset both of the L0 input temporal motion information and the L1 input temporal motion information to the motion information of the second collocated block and may also perform the bi-directional prediction on the current block.

As still another embodiment, the encoder and the decoder may determine whether or not they perform the processes of S920 to S940 based on a size of the current block. As an example, the encoder and the decoder may judge whether the size of the current block is smaller than a predetermined size. Here, the current block may be the CU, the PU, and/or the TU, and the predetermined size may be one of, for example, 8×8, 16×16, 32×32, and the like. Here, the encoder and the decoder may perform the processes of S920 to S940 in the case in which the size of the current block is smaller than the predetermined size.

As still another embodiment, the encoder and the decoder may also perform the processes of S920 to S940 in the case in which the L0 motion vector and/or the L1 motion vector in the motion information of the first collocated block correspond to the zero vector (0,0). In this case, in the above-mentioned step (S940), the encoder and the decoder may reset the motion vector (motion vectors) corresponding to the zero vector (0,0). As an example, the motion vector (the motion vectors) corresponding to the zero vector (0,0) may be set to the motion vector of the second collocated block. As another example, the motion vector (the motion vectors) corresponding to the zero vector (0,0) may also be set to the motion vector of the reconstructed neighboring block. As still another example, the motion vector (the motion vectors) corresponding to the zero vector (0,0) may also be set to a motion vector of a block positioned around the first collocated block. As still another embodiment, the encoder and the decoder may also perform the processes of S920 to S940 in the case in which the L0 motion vector and/or the L1 motion vector in the motion information of the first collocated block do not correspond to the zero vector (0,0). In this case, in the above-mentioned step (S940), the encoder and the decoder may reset the motion vector (motion vectors) that does not correspond to the zero vector (0,0). The motion vector (motion vectors) that does not correspond to the zero vector (0,0) may be reset to the motion vector of the second collocated block.

A condition for determining whether or not the processes of S920 to S940 are performed is not limited to the above-mentioned embodiments. That is, various conditions may be applied according to a condition and/or a need.

In the above-mentioned embodiments, since the L0 input temporal motion information and the L1 input temporal motion information are the temporally derived motion information, it is likely that they will correspond to motion information by movement of an object. Therefore, the encoder and the decoder may select the motion information that does not have the zero vector (0,0) rather than the motion information that has the zero vector (0,0) when they search the motion information to be used as the final L1 temporal motion information of the current block in the second collocated block. The reason is that it is likely that the block having the motion information corresponding to the zero vector (0,0) will correspond to a background rather than the object.

Meanwhile, the reset final L1 temporal motion information may also be the same as the L0 input temporal motion information of the current block. Therefore, the encoder and the decoder may select the motion information that is not the same as the L0 input temporal motion information when they search the motion information to be used as the final L1 temporal motion information of the current block in the second collocated block. For example, as in the above-mentioned S940, in the case in which the final L1 temporal motion information of the current block is derived based on the second collocated block, the encoder and the decoder may determine that a block having motion information different from the L0 input temporal motion information of the current block is a block used to derive the final L1 temporal motion information. In this case, the encoder and the decoder may also select only motion information having a difference of a predetermined threshold or less from the L0 input temporal motion information of the current block as the motion information to be used as the final L1 temporal motion information. Here, the predetermined threshold may be determined based on the mode information of the current block, the motion information of the current block, the mode information of the neighboring block, the motion information of the neighboring block, and the like, and be determined in various schemes.

Further, in the above-mentioned embodiments, the motion information of the second collocated block may include both of the L0 motion information and the L1 motion information. In this case, the encoder and the decoder may determine that one of the L0 motion information and the L1 motion information is the motion information to be used as the final L1 temporal motion information of the current block. As an example, the encoder and the decoder may use the L0 motion information of the second collocated block as the final L1 temporal motion information of the current block. In this case, when the L0 motion information is not present in the second collocated block, the encoder and the decoder may use the L1 motion information of the second collocated block as the final L1 temporal motion information of the current block. As another example, the encoder and the decoder may use the L1 motion information of the second collocated block as the final L1 temporal motion information of the current block. In this case, when the L1 motion information is not present in the second collocated block, the encoder and the decoder may use the L0 motion information of the second collocated block as the final L1 temporal motion information of the current block.

Meanwhile, the encoder and the decoder may not use the motion information of the second collocated block in order to reset the L1 input temporal motion information (for example, the L1 input motion vector) of the current block in the above-mentioned step (S940). In this case, the encoder and the decoder may reset the L1 input temporal motion information (for example, the L1 input motion vector) of the current block based on the motion information (for example, the motion vector) of the first collocated block. Hereinafter, embodiments related to this will be described based on a motion vector.

As an embodiment, the encoder and the decoder may use the motion information indicating a relative position moved from a position indicated by the motion information (the motion vector) of the first collocated block in the first collocated picture based on a predetermined distance and/or direction as the final L1 temporal motion information (the L1 motion vector) of the current block. As an example, the encoder and the decoder may use the motion information indicating a position moved from a position indicated by the motion information of the first collocated block in a vertical and/or horizontal direction by a ¼ pixel size (for example, (−1,0), (1,0), (0,−1), (0,1), (−1,−1), (−1,1), (1,−1), (1,1), or the like. Here, a ¼ pixel unit corresponds to 1) as the final L1 temporal motion information of the current block. As another example, the encoder and the decoder may use the motion information indicating a position moved from a position indicated by the motion information of the first collocated block in the vertical and/or horizontal direction by a ½ pixel size (for example, (−2,0), (2,0), (0,−2), (0,2), (−2,−2), (−2,2), (2,−2), (2,2), or the like. Here, a ¼ pixel unit corresponds to 1) as the final L1 temporal motion information of the current block. As still another example, the encoder and the decoder may use the motion information indicating a position moved from a position indicated by the motion information of the first collocated block in the vertical and/or horizontal direction by an integer pixel size (for example, (−4,0), (4,0), (0,−4), (0,4), (−4,−4), (−4,4), (4,−4), (4,4), or the like. Here, a ¼ pixel unit corresponds to 1) as the final L1 temporal motion information of the current block. Meanwhile, since the motion vector includes a vertical direction component and a horizontal direction component, the above-mentioned methods (the movement by the ¼ pixel size, the movement by the ½ pixel size, the movement by the integer pixel size) may also be independently applied to each of the horizontal direction component and the vertical direction component. In this case, a movement distance in the horizontal direction and a movement distance in the vertical direction may also be different from each other.

As another embodiment, the encoder and the decoder may change the motion information (the motion vector) value of the first collocated block into a value of other pixel unit and then use the changed value as the final L1 temporal motion information (the L1 motion vector) of the current block. As an example, in the case in which the motion information value of the first collocated block is a value of the ¼ pixel unit, the encoder and the decoder may change the motion information value of the first collocated block into a value of a ½ pixel unit based on a shift operation, or the like, and use the changed value as the final L1 temporal motion information of the current block. As another example, in the case in which the motion information value of the first collocated block is a value of a ½ pixel unit, the encoder and the decoder may change the motion information value of the first collocated block into a value of an integer pixel unit based on the shift operation, or the like, and uses the changed value as the final L1 temporal motion information of the current block.

The method of resetting the L1 input temporal motion information (for example, the L1 input motion vector) of the current block based on the motion information (for example, the motion vector) of the first collocated block is not limited to the above-mentioned embodiments, but may be variously applied in various forms according to an implementation and/or a need. In addition, the methods according to the above-mentioned embodiment may be equally or similarly applied to the case of resetting the L1 input temporal motion information based on the motion information of the second collocated block as shown in step (S940) of FIG. 9.

Meanwhile, in the above-mentioned embodiment, the input temporal motion information input to step (S910) may include an input reference picture index as well as an input motion vector. Here, the L0 input motion vector and the L1 input motion vector may be a motion vector temporally derived based on the first collocated block as described above, and the L0 input reference picture index and the L1 input reference picture index may be a reference picture index spatially derived from the reconstructed neighboring block. Here, the L0 input reference picture index and the L1 input reference picture index may be set to the non-negative smallest value among the reference picture indices of the reconstructed neighboring block. Meanwhile, as another example, an L0 input reference picture index and an L1 input reference picture index may also be set to 0 regardless of the motion information of the reconstructed neighboring block.

In the case in which the L1 input motion vector is reset based on the second collocated block, the resetting process may also be performed on the L1 input reference picture index. Hereinafter, embodiments of a process of resetting the L1 input reference picture index will be described.

As an example, the encoder and the decoder may reset the L1 input reference picture index based on the second collocated block. As described above, the encoder and the decoder may use the motion information of the second collocated block as the final L1 temporal motion information of the current block. In this case, the encoder and the decoder may reset the L1 input reference picture index to the reference picture index of the second collocated block to derive a final L1 reference picture index. As another embodiment, the encoder and the decoder may reset the L1 input reference picture index to a predetermined fixed reference picture index value to derive a final L1 reference picture index.

As still another embodiment, in the case in which the L0 input temporal motion information (for example, the L0 input motion vector, the L0 input reference picture index, and the like) and L1 input temporal motion information (for example, the L1 motion vector, the L1 input reference picture index, and the like) are the same as each other, the encoder and the decoder may reset both of the L0 input reference picture index and the L1 input reference picture index to a value of 0 to use the reset value as final temporal motion information. The reason is that in the case in which the L0 input temporal motion information and the L1 input temporal motion information are the same as each other, it is likely that both of the L0 reference picture index and the L1 reference picture index will be 0.

As still another embodiment, the encoder and the decoder may reset the L1 input reference picture index value to the same value as that of the L0 input reference picture index. On the other hand, the encoder and the decoder may also reset the L1 input reference picture index value to the reference picture index value that is not the same as that of the L0 input reference picture index. Reference picture indices that are not the same as the L0 input reference picture index among the reference picture indices of the reconstructed neighboring blocks may be present. In this case, for example, the encoder and the decoder may use the most frequently used reference picture index among the reference picture indices that are not the same as the L0 input reference picture index in order to reset the L1 input reference picture index. As another example, the encoder and the decoder may also use the reference picture index having the non-negative smallest value among the reference picture indices that are not the same as the L0 input reference picture index in order to reset the L1 input reference picture index.

Meanwhile, as described above, the encoder and the decoder may reset the L1 input motion vector value to the same value as that of the motion vector of the second collocated block to derive a final L1 temporal motion vector. In this case, the motion vector of the second collocated block may also be scaled and used according to the L1 input reference picture index and/or the reset L1 reference picture index. The L1 input reference picture index may be used as the final L1 reference picture index as it is without being subjected to the resetting process or be subjected to the resetting process and then used as the final L1 reference picture index as in the above-mentioned embodiment. Here, a reference picture corresponding to the motion vector of the second collocated block and a reference picture indicated by the final L1 reference picture index may be different from each other. In this case, the encoder and the decoder may perform scaling on the motion vector of the second collocated block and use the scaled motion vector as the final L1 temporal motion vector of the current block.

The above-mentioned embodiments may be combined with each other according to the process of resetting the motion vector and the process of resetting the reference picture index (for example, RefIdxLX, X=0,1). Hereinafter, in embodiments to be described below, it is assumed that the L1 input motion vector is reset based on the second collocated block. That is, it is assumed that the encoder and the decoder reset the L1 input motion vector to one of the motion vectors of the second collocated blocks.

As an embodiment, the encoder and the decoder may use the first collocated picture used to derive the L0 input temporal motion information as the second collocated picture as it is, and the second collocated block may be derived from the second collocated picture. In this case, the encoder and the decoder may scale and use the motion vector of the second collocated block in order to reset the L1 input motion vector. In this case, the scaled motion vector may be used as the final L1 temporal motion information. In this case, as an example, the L1 input reference picture index may be used as the final L1 temporal motion information as it is without being subjected to the resetting process. That is, the encoder and the decoder may allocate the L1 input reference picture index to the L1 temporal motion information of the current block as it is. As another example, the L1 input reference picture index value may also be reset to a predetermined fixed reference picture index value. That is, the encoder and the decoder may allocate a predetermined fixed reference picture index value to the L1 temporal motion information of the current block, and the predetermined fixed reference picture index may be used as the final L1 temporal motion information.

As another embodiment, the encoder and the decoder may use the first collocated picture used to derive the L0 input temporal motion information as the second collocated picture as it is, and the second collocated block may be derived from the second collocated picture, as in the above-mentioned embodiment. In this case, the encoder and the decoder may derive a motion vector that is not same as the L0 input motion vector and has a difference of a predetermined threshold or less from the L0 input motion vector among the motion vectors of the second collocated blocks in order to reset the L1 input motion vector. The encoder and the decoder may perform scaling on the derived motion vector, and the scaled motion vector may be used as the final L1 temporal motion information. In this case, as an example, the L1 input reference picture index may be used as the final L1 temporal motion information as it is without being subjected to the resetting process. That is, the encoder and the decoder may allocate the L1 input reference picture index to the L1 temporal motion information of the current block as it is. As another example, the L1 input reference picture index value may also be reset to a predetermined fixed reference picture index value. That is, the encoder and the decoder may allocate a predetermined fixed reference picture index value to the L1 temporal motion information of the current block, and the predetermined fixed reference picture index may be used as the final L1 temporal motion information.

As still another embodiment, the encoder and the decoder may also use a reference picture that is not the same as the first collocated picture used to derive the L0 input temporal motion information as the second collocated picture. Here, the second collocated picture may be a reference picture that is not the same as the first collocated picture and is most recently decoded among the reference pictures in the L1 reference picture list. As another example, the encoder and the decoder may also select the reference picture most frequently used based on the reference picture number of the reconstructed neighboring block as the second collocated picture. The second collocated block may be derived from the second collocated picture. In this case, the encoder and the decoder may scale and use the motion vector of the second collocated block in order to reset the L1 input motion vector. In this case, the scaled motion vector may be used as the final L1 temporal motion information. In this case, as an example, the L1 input reference picture index may be used as the final L1 temporal motion information as it is without being subjected to the resetting process. That is, the encoder and the decoder may allocate the L1 input reference picture index to the L1 temporal motion information of the current block as it is. As another example, the L1 input reference picture index value may also be reset to a predetermined fixed reference picture index value. That is, the encoder and the decoder may allocate a predetermined fixed reference picture index value to the L1 temporal motion information of the current block, and the predetermined fixed reference picture index may be used as the final L1 temporal motion information.

As another embodiment, the encoder and the decoder may use the reference picture that is not the same as the first collocated picture used to derive the L0 input temporal motion information as the second collocated picture, and the second collocated block may be derived from the second collocated picture, as in the above-mentioned embodiment. Here, the second collocated picture may be a reference picture that is not the same as the first collocated picture and is most recently decoded among the reference pictures in the L1 reference picture list. As another example, the encoder and the decoder may also select the reference picture most frequently used based on the reference picture number of the reconstructed neighboring block as the second collocated picture. In this case, the encoder and the decoder may derive a motion vector that is not same as the L0 input motion vector and has a difference of a predetermined threshold or less from the L0 input motion vector among the motion vectors of the second collocated blocks in order to reset the L1 input motion vector. The encoder and the decoder may perform scaling on the derived motion vector, and the scaled motion vector may be used as the final L1 temporal motion vector. In this case, as an example, the L1 input reference picture index may be used as the final L1 temporal motion information as it is without being subjected to the resetting process. That is, the encoder and the decoder may allocate the L1 input reference picture index to the L1 temporal motion information of the current block as it is. As another example, the L1 input reference picture index value may also be reset to a predetermined fixed reference picture index value. That is, the encoder and the decoder may allocate a predetermined fixed reference picture index value to the L1 temporal motion information of the current block, and the predetermined fixed reference picture index may be used as the final L1 temporal motion information.

A combination of the embodiments of the process of resetting the motion vector and the process of resetting the reference picture index is not limited to the above-mentioned embodiment, but may be provided in various forms according to an implementation and/or a need.

Meanwhile, the reset L1 temporal motion information may be the same as the L0 temporal motion information of the current block. Therefore, when the reset L1 temporal motion information is the same as the L0 temporal motion information of the current block, the encoder and the decoder may reset the prediction direction information of the current block to the uni-directional prediction. In this case, the encoder and the decoder may use only the L0 temporal motion information as the temporal motion information of the current block. This method, which is a combination with the above-mentioned embodiments, may be applied to the present invention.

Figure 10:
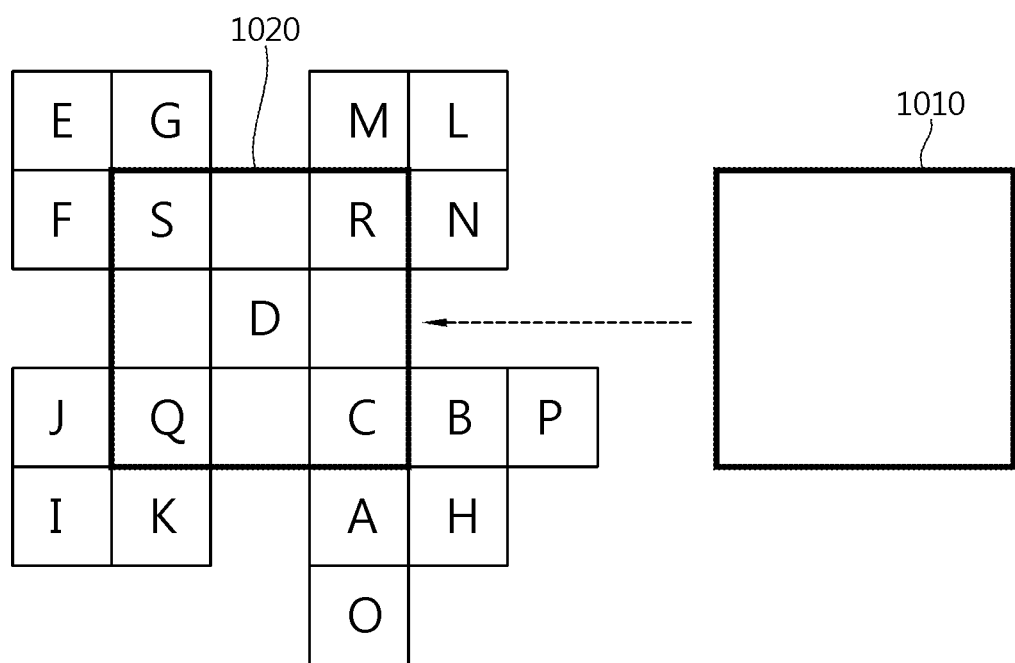
FIG. 10 is a diagram schematically showing an embodiment of a second collocated block used to reset L1 temporal motion information.

FIG. 10 is a diagram schematically showing an embodiment of a second collocated block used to reset L1 temporal motion information.

The encoder and the decoder may determine the second collocated block based on a collocated block present at the spatially same position as that of the current block within the second collocated picture. In FIG. 10, a block 1010 indicates a current block and a block 1020 indicates a collocated block in the second collocated picture. Here, the second collocated picture may be determined in various schemes.

As an embodiment, the encoder and the decoder may determine that one of the reference pictures included in the L0 reference picture list is the second collocated picture. As an example, the encoder and the decoder may determine that a first reference picture in the L0 reference picture list is the second collocated picture. As another example, the encoder and the decoder may determine that a second reference picture in the L0 reference picture list is the second collocated picture. As still another example, the encoder and the decoder may determine that a third reference picture in the L0 reference picture list is the second collocated picture. As still another example, the encoder and the decoder may determine that a fourth reference picture in the L0 reference picture list is the second collocated picture.

As another embodiment, the encoder and the decoder may determine that one of the reference pictures included in the L1 reference picture list is the second collocated picture. As an example, the encoder and the decoder may determine that a first reference picture in the L1 reference picture list is the second collocated picture. As another example, the encoder and the decoder may determine that a second reference picture in the L1 reference picture list is the second collocated picture. As still another example, the encoder and the decoder may determine that a third reference picture in the L1 reference picture list is the second collocated picture. As still another example, the encoder and the decoder may determine that a fourth reference picture in the L1 reference picture list is the second collocated picture.

As another embodiment, the encoder and the decoder may use a reference picture providing the highest encoding efficiency among all reference pictures (and/or some reference pictures determined according to a predetermined condition) in the L0 reference picture list and the L1 reference picture list as the second collocated picture. Here, the encoding efficiency may be determined based on motion information of a block present at a position corresponding to that of the second collocated position in each reference picture. Here, the encoder may derive the second collocated picture based on the encoding efficiency and transmit the second collocated picture information indicating the second collocated picture to the decoder. The decoder may determine the second collocated picture based on the transmitted second collocated picture information.

In the above-mentioned embodiments, the encoder and the decoder may also determined that only the reference picture that is not the same as the first collocated picture used to derive the L0 input temporal motion information is the second collocated picture. In this case, only the reference picture that is not the same of the first collocated picture may be used to derive the final L1 temporal motion information of the current block.

The method of determining the second collocated picture is not limited to the above-mentioned embodiment. That is, the second collocated picture may also be determined in other schemes according to an implementation and/or a need.

Meanwhile, in the embodiment of FIG. 10, a block positioned at the center of an inner portion of the collocated block 1020 will be called a block D, a block positioned at a left upper corner of the inner portion of the collocated block 1020 will be called a block S, a block positioned at a left lower corner of the inner portion of the collocated block 1020 will be called a block Q, a block positioned at a right upper corner of the inner portion of the collocated block 1020 will be called a block R, and a block positioned at a right lower corner of the inner portion of the collocated block 1020 will be called a block C. In addition, a block positioned at the uppermost portion among blocks adjacent to the left of the collocated block 1020 will be called a block F, a block positioned at the lowermost portion among the blocks adjacent to the left of the collocated block 1020 will be called a block J, a block positioned at the leftmost portion among blocks adjacent to an upper portion of the collocated block 1020 will be called a block G, a block positioned at the rightmost portion among the blocks adjacent to the upper portion of the collocated block 1020 will be called a block M, a block positioned at the uppermost portion among blocks adjacent to the right of the collocated block 1020 will be called a block N, a block positioned at the lowermost portion among the blocks adjacent to the right of the collocated block 1020 will be called a block B, a block positioned at the leftmost portion among blocks adjacent to a lower portion of the collocated block 1020 will be called a block K, and a block positioned at the rightmost portion among the blocks adjacent to the lower portion of the collocated block 1020 will be called a block A. Further, a block positioned at a left upper corner of an outer portion of the collocated block 1020 will be called a block E, a block positioned at a left lower corner of the outer portion of the collocated block 1020 will be called a block I, a block positioned at a right upper corner of the outer portion of the collocated block 1020 will be called a block L, and a block positioned at a right lower corner of the outer portion of the collocated block 1020 will be called a block H. In addition, a block positioned to be adjacent to the right of the block B will be called a block P, and a block positioned to be adjacent to a lower portion of the block A will be called a block O.

As described above in the embodiment of FIG. 9, the encoder and the decoder may use the motion information of the second collocated block as the final L1 temporal motion information of the current block according to a predetermined condition. That is, the encoder and the decoder may reset the L1 input temporal motion information value to the motion information value of the second collocated block. In this case, the second collocated block and/or the motion information used as the final L1 temporal motion information may be derived by various methods.

As an embodiment, the encoder and the decoder may derive the motion information used as the final L1 temporal motion information from one block present at a predetermined position based on the collocated block among blocks positioned at the inner and outer portions of the collocated block. In this case, one block present at the predetermined position may correspond to the second collocated block. Here, the block present at the predetermined position may be a block A, a block B, a block C, a block D, a block E, a block F, a block G, a block H, a block I, a block J, a block K, a block L, a block M, a block N, a block O, a block P, a block Q, a block R, or a block S.

As another embodiment, the encoder and the decoder may scan a plurality of blocks present at the predetermined positions among the blocks positioned at the inner and outer portions of the collocated blocks in a predetermined order. In this case, the encoder and the decoder may use the motion information of the first block in which the motion information is present in scan order as the final L1 temporal motion information of the current block. Here, the first block in which the motion information is present may correspond to the second collocated block. A scan target block and a scan order may be determined in various forms. As an example, the encoder and the decoder may scan the blocks in order to the block H, the block D, the block A, the block B, the block C, the block I, the block J, the block F, the block G, and the block E.

As still another embodiment, the encoder and the decoder may derive an intermediate value of the motion information of the plurality of blocks present at the predetermined positions among the blocks positioned at the inner and outer portions of the collocated block and use the derived intermediate value as the final L1 temporal motion information of the current block. As an example, the plurality of blocks may be the block H, the block D, the block A, the block B, the block C, the block I, the block J, the block F, the block G, and the block E.

The method of deriving the L1 temporal motion information of the current block from the second collocated block is not limited thereto. That is, the L1 temporal motion information of the current block may be derived by various methods according to an implementation and/or a need.

Figure 11:
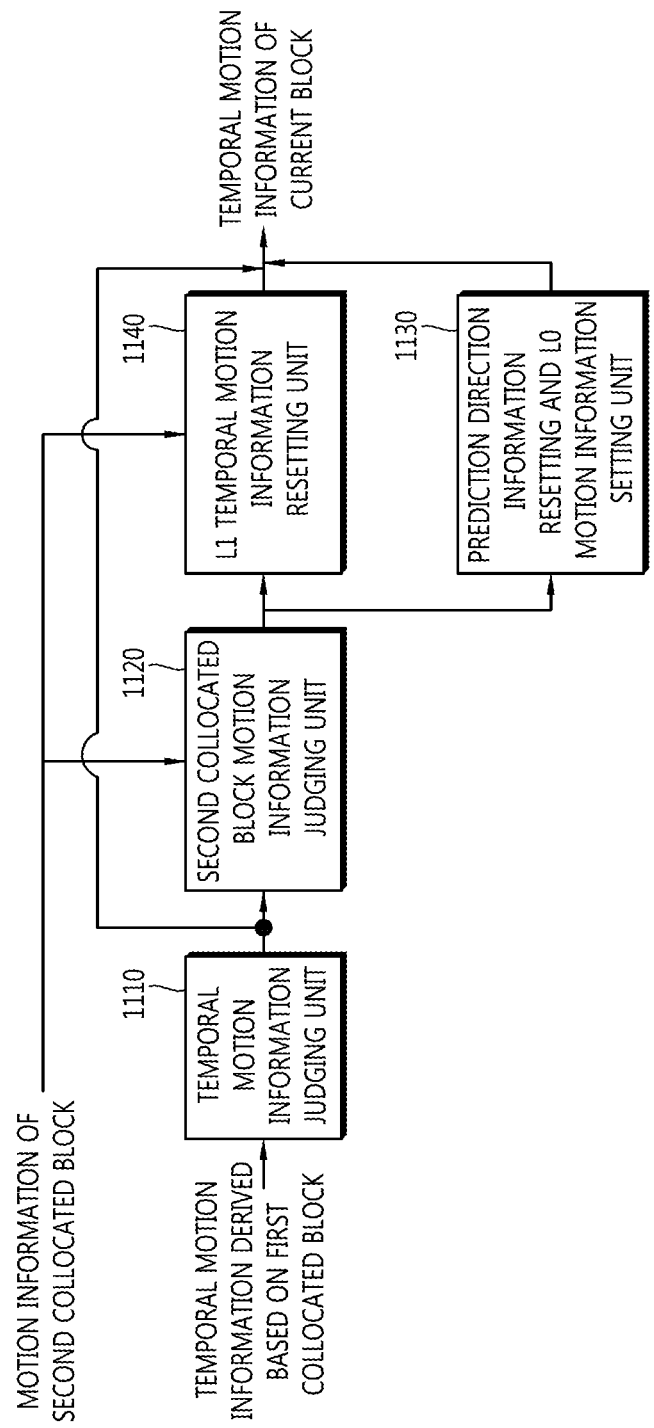
FIG. 11 is a block diagram schematically showing an embodiment of an inter prediction apparatus capable of performing the process of deriving temporal motion information according to the embodiment of FIG. 9.

FIG. 11 is a block diagram schematically showing an embodiment of an inter prediction apparatus capable of performing the process of deriving temporal motion information according to the embodiment of FIG. 9. The inter prediction apparatus according to the embodiment of FIG. 11 may include a temporal motion information judging unit 1110, a second collocated block motion information judging unit 1120, a prediction direction information resetting and L0 motion information setting unit 1130, and an L1 temporal motion information resetting unit 1140.

Referring to FIG. 11, the temporal motion information judging unit 1110 may judge whether or not the L0 input temporal motion information and the L1 input temporal motion information in the input temporal motion information are the same as each other, that is, whether or not the L0 input reference picture number and the L1 input reference picture number are the same as each other and the L0 input motion vector and the L1 input motion vector are the same as each other.

In the case in which the L0 input temporal motion information and the L1 input temporal motion information are not the same as each other, the inter prediction apparatus may use the input temporal motion information as the temporal motion information of the current block as it is. In the case in which the AMVP is applied, the temporal motion information of the current block may be determined or registered to be a prediction motion vector candidate for the current block. Further, in the case in which the merge is applied, the temporal motion information of the current block may be determined or registered to be a merge candidate for the current block. In the case in which the L0 input temporal motion information and the L1 input temporal motion information are the same as each other, a judging process by the second collocated block motion information judging unit 1120 may be performed.

Meanwhile, as described above with reference to FIG. 9, the temporal motion information judging unit 1110 may also judge whether or not the L0 input reference picture number and the L1 input reference picture number are the same as each other rather than whether or not the L0 input temporal motion information and the L1 input temporal motion information are the same as each other or a prediction direction of the first collocated block. For example, in the case in which the L0 input reference picture number and the L1 input reference picture number are not the same as each other, the inter prediction apparatus may use the input temporal motion information as the temporal motion information of the current block as it is, and in the case in which the L0 input reference picture number and the L1 input reference picture number are the same as each other, the judging process by the second collocated block motion information judging unit 1120 may be performed. As another example, in the case in which the prediction direction of the first collocated block is the bi-directional prediction, the inter prediction apparatus may use the input temporal motion information as the temporal motion information of the current block as it is, and in the case in which the prediction direction of the first collocated block is the uni-directional prediction, the judging process by the second collocated block motion information judging unit 1120 may be performed.

The second collocated block motion information determining unit 1120 may judge whether the motion information of the second collocated block is present. In the case in which the motion information of the second collocated block is not present (for example, in the case in which the block having the motion information among the second collocated blocks positioned at predetermined positions and/or positions selected by a predetermined method is not present), a prediction direction information resetting and L0 motion information setting process by the prediction direction information resetting and L0 motion information setting unit 1130 may be performed. Further, in the case in which the motion information of the second collocated block is present (for example, in the case in which the block having the motion information among the second collocated blocks positioned at the predetermined positions and/or the positions selected by the predetermined method is present), a resetting process by the L1 temporal motion information resetting unit 1140 may be performed.

In the case in which the motion information of the second collocated block is not present, the prediction direction information resetting and L0 motion information setting unit 1130 may reset the prediction direction information of the current block to the unit-directional perdition. In addition, in this case, the prediction direction information resetting and L0 motion information setting unit 1130 may set only the L0 input temporal motion information among the input temporal motion information to the final temporal motion information of the current block.

In the case in which the motion information of the second collocated block is present, the L1 temporal motion information resetting unit 1140 may reset the L1 input temporal motion information of the current block to the motion information of the second collocated block. That is, the inter prediction apparatus may use the motion information of the second collocated block as the final L1 temporal motion information of the current block. In this case, when the motion information of the second collocated block includes the zero vector (0,0), the L1 temporal motion information resetting unit 1140 may also use the motion information of the block positioned around the second collocated block as the final L1 temporal motion information of the current block. Since specific embodiments of each of the above-mentioned methods have been described with reference to FIGS. 6 and 7, a description thereof will be omitted.

Figure 12:
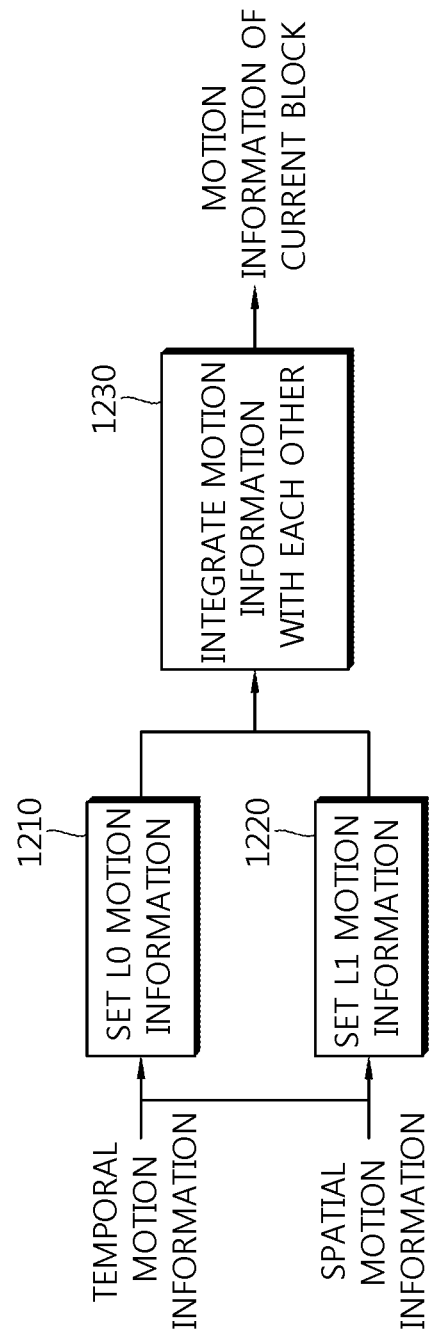
FIG. 12 is a flow chart schematically showing an embodiment of a method of deriving motion information of a current block according to the present invention.

FIG. 12 is a flow chart schematically showing an embodiment of a method of deriving motion information of a current block according to the present invention.

As described above, the encoder and the decoder may derive the motion information of the current block based on the motion information of the reconstructed neighboring block and/or the motion information of the collocated block. Here, the reconstructed neighboring block, which is a block in a previously encoded and/or decoded and reconstructed current picture, may include blocks adjacent to the current block and/or blocks positioned at an outer corner of the current block. In addition, the collocated block means a block corresponding to the current block in the collocated picture, and the collocated picture may correspond to one of the reference pictures in the reference picture list as an example. Here, the motion information derived from the reconstructed neighboring block may be called spatial motion information, and the motion information derived from the collocated block may be called temporal motion information. Here, each of the spatial motion information and the temporal motion information may include prediction direction information, an L0 reference picture number, an L1 reference picture number, an L0 motion vector, an L1 motion vector, and the like.

Meanwhile, in an image decoding process, due to excessive traffic of a network, a picture that is not decoded among the previous pictures of the current picture (and/or the decoding target picture) may be present. In this case, since an erroneous collocated block may be used in the process of deriving the temporal motion information for the block in the current picture and accurate temporal motion information may not be derived, the current picture may not be appropriately decoded. Therefore, in order to solve these problems, the encoder and the decoder may spatially derive one of the L0 motion information and the L1 motion information based on the reconstructed neighboring block and temporally derive the other thereof based on the collocated block, in deriving the motion information of the current block. That is, the encoder and the decoder may independently set each of the L0 motion information and the L1 motion information. In this case, even through the previous picture that is not decoded is present, the encoder and the decoder may reconstruct the current block to some degree.

Referring to FIG. 12, the encoder and the decoder may set the L0 motion information (1210). At the time, the encoder and the decoder may use the motion information (the spatial motion information) spatially derived based on the reconstructed neighboring block as the L0 motion information or use the motion information (the temporal motion information) temporally derived based on the collocated block as the L0 motion information. That is, the L0 motion information may be spatially derived based on the reconstructed neighboring block or be temporally derived based on the collocated block.

Again referring to FIG. 12, the encoder and the decoder may set the L1 motion information (1220). At the time, the encoder and the decoder may use the motion information (the spatial motion information) spatially derived based on the reconstructed neighboring block as the L1 motion information or use the motion information (the temporal motion information) temporally derived based on the collocated block as the L1 motion information. That is, the L1 motion information may be spatially derived based on the reconstructed neighboring block or be temporally derived based on the collocated block.

As an embodiment, in the case in which the L0 motion information is the motion information temporally derived based on the collocated block, the encoder and the decoder may use the spatial motion information derived based on the reconstructed neighboring block as the L1 motion information. As an embodiment, in the case in which the L0 motion information is the motion information spatially derived based on the reconstructed neighboring block, the encoder and the decoder may use the temporal motion information derived based on the collocated block as the L1 motion information.

Meanwhile, in the above-mentioned embodiment, the encoder and the decoder may also derive the L1 motion information based on the L0 motion information. As an example, it is assumed that the L0 motion information is the motion information derived based on the collocated block. In this case, as described above, the encoder and the decoder may use the spatial motion information spatially derived based on the reconstructed neighboring block as the L1 motion information. In this case, as an example, the encoder and the decoder may derive only the motion information that is the same as or similar to the L0 motion information as the spatial motion information to be used as the L1 motion information. As another example, the encoder and the decoder may also derive only the motion information that is not the same as the L0 motion information as the spatial motion information to be used as the L1 motion information. In this case, the encoder and the decoder may also derive only the motion information having a difference of a predetermined threshold or less from the L0 motion information as the spatial motion information to be used as the L1 motion information. Here, the predetermined threshold may be determined based on the mode information of the current block, the motion information of the current block, the mode information of the neighboring block, the motion information of the neighboring block, and the like, and be determined in various schemes.

The method of setting the L0 motion information and the L1 motion information is not limited to the above-mentioned embodiment, but may be changed according to an implementation and a need.

Meanwhile, in the case in which the L0 motion information and/or the L1 motion information are spatially derived based on the motion information of the reconstructed neighboring block, the motion information of the reconstructed neighboring block may also include both of the spatially derived spatial motion information and the temporally derived temporal motion information. In this case, the encoder and the decoder may derive the L0 motion information of the current block and/or the L1 motion information of the current block using only the spatially derived spatial motion information among the motion information of the reconstructed neighboring block.

Again referring to FIG. 12, the encoder and the decoder may integrate the L0 motion information and the L1 motion information with each other to derive the motion information of the current block (1230).

Meanwhile, the L0 motion information and the L1 motion information in the derived motion information of the current block may also be the same as each other. Therefore, in the case in which the L0 motion information and the L1 motion information are the same as each other, the encoder and the decoder may reset the prediction direction information of the current block to the uni-directional prediction. In this case, the encoder and the decoder may use only the L0 motion information as the motion information of the current block.

Figure 13:
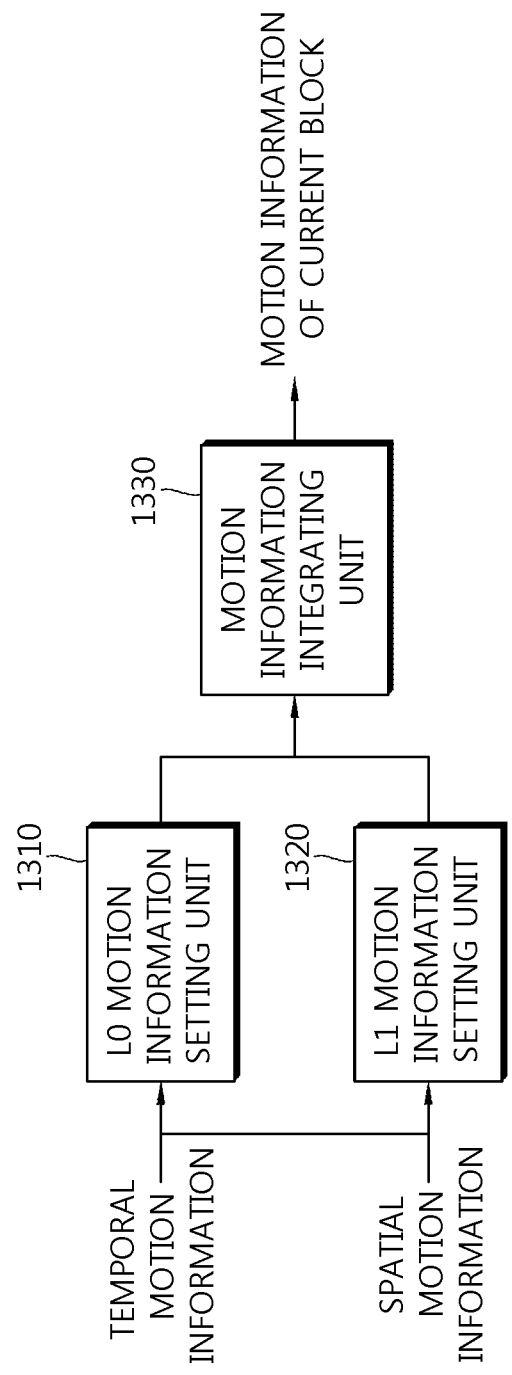
FIG. 13 is a block diagram schematically showing an embodiment of an inter prediction apparatus capable of performing the process of deriving motion information according to the embodiment of FIG. 12.

FIG. 13 is a block diagram schematically showing an embodiment of an inter prediction apparatus capable of performing the process of deriving motion information according to the embodiment of FIG. 12. The inter prediction apparatus according to the embodiment of FIG. 13 may include an L0 motion information setting unit 1310, an L1 motion information setting unit 1320, and a motion information integrating unit 1330.

As described above in the embodiment of FIG. 12, the encoder and the decoder may independently set each of the L0 motion information and the L1 motion information. In this case, the encoder and the decoder may spatially derive one of the L0 motion information and the L1 motion information based on the reconstructed neighboring block and temporally derive the other thereof based on the collocated block.

Referring to 13, the L0 motion information setting unit 1310 may set the L0 motion information. At the time, the encoder and the decoder may use the motion information (the spatial motion information) spatially derived based on the reconstructed neighboring block as the L0 motion information or use the motion information (the temporal motion information) temporally derived based on the collocated block as the L0 motion information. That is, the L0 motion information may be spatially derived based on the reconstructed neighboring block or be temporally derived based on the collocated block.

Again referring to 13, the L1 motion information setting unit 1320 may set the L1 motion information. At the time, the encoder and the decoder may use the motion information (the spatial motion information) spatially derived based on the reconstructed neighboring block as the L1 motion information or use the motion information (the temporal motion information) temporally derived based on the collocated block as the L1 motion information. That is, the L1 motion information may be spatially derived based on the reconstructed neighboring block or be temporally derived based on the collocated block.

Since a specific embodiment of the method of setting the L0 motion information and the L1 motion information has been described with reference to FIG. 12, a description thereof will be omitted.

Again referring to FIG. 13, the motion information integrating unit 1330 may integrate the L0 motion information set in the L0 motion information setting unit 1310 and the L1 motion information set in the L1 motion information setting unit 1320 with each other to derive the motion information of the current block.

Figure 14:
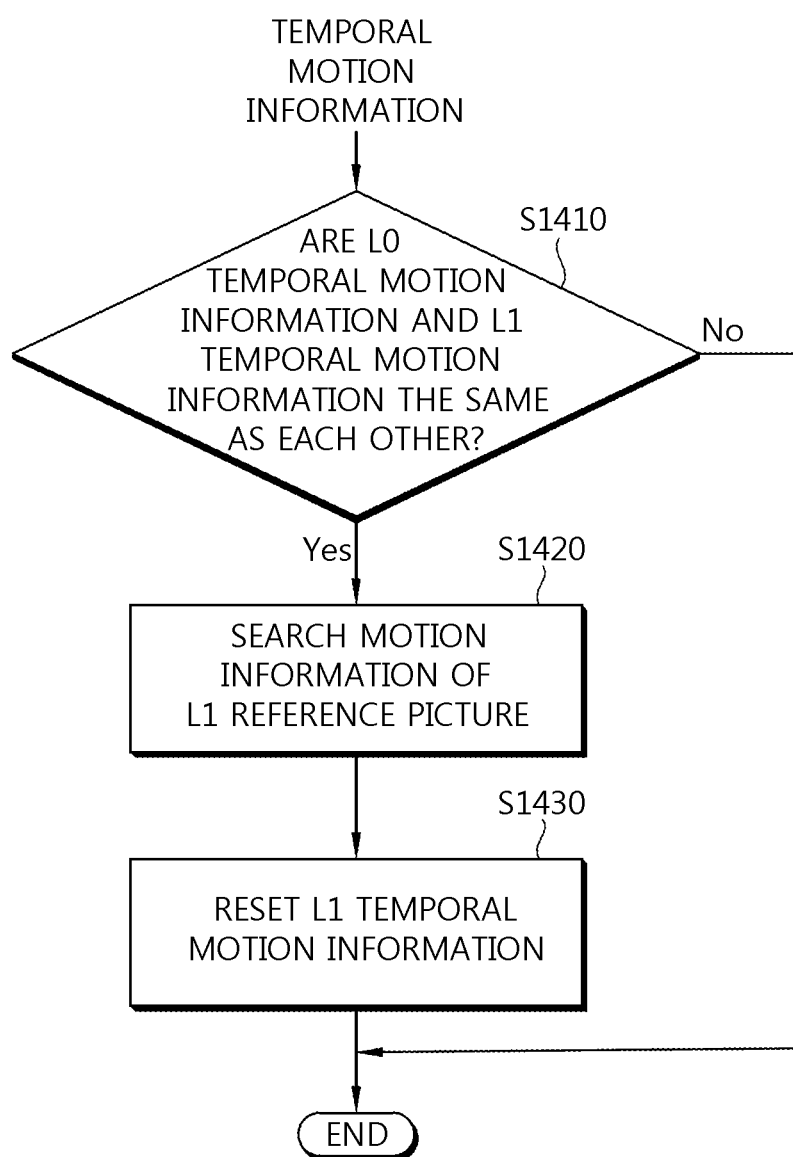
FIG. 14 is a flow chart schematically showing still another embodiment of a method of deriving temporal motion information of a current block according to the present invention.

FIG. 14 is a flow chart schematically showing still another embodiment of a method of deriving temporal motion information of a current block according to the present invention.

Although embodiments to be described below will be described based on the temporal motion information, the present invention is not limited thereto. For example, the method according to the embodiment of FIG. 14 may be equally or similarly applied to the motion information of the current block derived based on the merge candidate list in the merge mode and/or the motion information of the current block derived based on the prediction motion vector candidate list in the AMVP mode as well as the temporal motion information in the merge mode and/or the AMVP mode.

As described above, the temporal motion information may be derived based on the motion information of the collocated block corresponding to the current block within the previously reconstructed collocated picture. Here, the collocated picture may correspond to one of reference pictures included in a reference picture list as an example. The encoder and the decoder may determine a predetermined relative position based on the block present at the spatially same position as that of the current block in the collocated picture and derive the collocated block based on the determined predetermined relative position (for example, the positions of the inner portion and/or the outer portion of the block present at the spatially same position as that of the current block). The temporal motion information derived based on the collocated block may include prediction direction information, an L0 reference picture number, an L1 reference picture number, an L0 motion vector, an L1 motion vector, and the like.

Referring to FIG. 14, the encoder and the decoder may judge whether or not the L0 temporal motion information and the L1 temporal motion information in the temporal motion information derived based on the collocated block are the same as each other, that is, whether or not the L0 reference picture number and the L1 reference picture number are the same as each other and the L0 motion vector and the L1 motion vector are the same as each other (S1410).

Hereinafter, in embodiments of FIGS. 14 and 15 to be described below, for convenience of explanation, the temporal motion information input to step (S1410) before resetting the temporal motion information will be called input temporal motion information (L0 input temporal motion information and L1 input temporal motion information). In this case, the input temporal motion information may correspond to the temporal motion information derived based on the collocated block. In addition, a motion vector included in the input temporal motion information will be called an input motion vector (an L0 input motion vector and an L1 input motion vector), a reference picture index included in the input temporal motion information will be called an input reference picture index (an L0 input reference picture index and an L1 input reference picture index), and a reference picture number included in the input temporal motion information will be called an input reference picture number (an L0 input reference picture number and an L1 input reference picture number). In addition, in embodiments to be described below, a reference picture indicated by an L0 input reference picture number will be called an L0 reference picture, and a reference picture indicated by an L1 input reference picture number will be called an L1 reference picture.

In the case in which the L0 temporal motion information and the L1 temporal motion information are not the same as each other, that is, in the case in which the L0 reference picture number and the L1 reference picture number are not the same as each other and/or the L0 motion vector and the L1 motion vector are not the same as each other, the encoder and the decoder may use the input temporal motion information derived based on the collocated block as the final temporal motion information of the current block as it is. In the case in which the AMVP is applied, the final temporal motion information may be determined or registered to be a prediction motion vector candidate for the current block. Further, in the case in which the merge is applied, the final temporal motion information may be determined or registered to be a merge candidate for the current block.

In the case in which the L0 input temporal motion information and the L1 input temporal motion information are the same as each other, the encoder and the decoder may search or derive the motion information to be used as the final L1 temporal motion information in the L1 reference picture (S1420). Here, since the L0 input temporal motion information and the L1 input temporal motion information are the same as each other, the L1 reference picture may correspond to the same picture as the L0 reference picture. Therefore, in embodiments to be described below, the L1 reference picture means the same picture as the L0 reference picture.

As an example, the encoder and the decoder may search and derive the motion information from the L1 reference picture by the same method. In this case, the encoder may not transmit the motion information derived from the L1 reference picture to the decoder. As another example, the encoder may derive the motion information from the L1 reference picture by a predetermined method and then allow the derived motion information to be included in a bit stream and be transmitted to the decoder. In this case, the decoder may determine the motion information to be used as the final L1 temporal motion information based on the transmitted motion information. The motion information derived in the encoder may include the reference picture index, the motion vector, and the like, and the encoder may independently transmit each of the reference picture index and the motion vector to the decoder. In this case, the encoder may also calculate a difference value between an actual motion vector of the current block and the motion vector derived from the L1 reference picture and then transmit the difference value to the decoder.

Again referring to FIG. 14, the encoder and the decoder may use the motion information derived from the L1 reference picture as the final L1 temporal motion information of the current block (S1430). That is, at the time, the encoder and the decoder may reset the L1 input temporal motion information value to the motion information value derived from the L1 reference picture.

Hereinafter, embodiments of a method of deriving the motion information to be used as the final L1 temporal motion information from the L1 reference picture will be described.

As an embodiment, the encoder and the decoder may use the motion information indicating a position present in a predetermined range based on a position indicated by the L0 input temporal motion information (motion vector) in the L1 reference picture as the final L1 temporal motion information (the L1 motion vector). More specifically, the predetermined range may correspond to a range including a position in a distance of +T and/or −T in the vertical and/or horizontal directions, based on a position indicated by the L0 input temporal motion information within the L1 reference picture. Here, as an example, T may be a value indicating a distance of a ¼ pixel unit. As another example, T may be a value indicating a distance of a ½ pixel unit. As still another example, T may also be a value indicating a distance of an integer pixel unit. In the case in which the integer pixel unit is used, since an interpolation process may not be performed at the time of motion compensation, computational complexity may be reduced.

As another example, the encoder may derive a region that is most appropriately matched or similar to an input block (an original block) corresponding to the current block in the L1 reference picture. In this case, the encoder may derive the motion information to be used as the final L1 temporal motion information of the current block based on the derived region. As an example, the encoder may derive the motion vector to be used as the final L1 temporal motion information based on the position of the block corresponding to the derived region and the position of the current block and derive the reference picture index (and/or the reference picture number) to be used as the final L1 temporal motion information based on the block corresponding to the derived region. The derived motion information may be included in the bit stream and then transmitted from the encoder to the decoder. In this case, the decoder may reset the L1 input temporal motion information based on the transmitted motion information.

The reference picture index (and/or the reference picture number) derived from the L1 reference picture may be different from the L1 input reference picture index (and/or the L1 input reference picture number). In this case, the encoder and the decoder may use the reference picture index (and/or the reference picture number) derived from the L1 reference picture as the final L1 temporal motion information of the current block.

The method of deriving the motion information to be used as the final L1 temporal motion information based on the L1 reference picture is not limited to the above-mentioned embodiment. That is, the encoder and the decoder may also derive the motion information in other schemes according to an implementation and/or a need.

Meanwhile, although whether or not processes of S1420 to S1430 are performed is determined based on the sameness of the L0 input temporal motion information and the L1 input temporal motion information in the above-mentioned embodiment, the encoder and the decoder may also determine whether or not they perform the processes of S1420 to S1430 based on other conditions.

As an embodiment, the encoder and the decoder may determine whether or not they perform the processes of S1420 to S1430 based on a prediction direction of the collocated block. As described above, the prediction direction information means information indicating whether the uni-directional prediction or the bi-directional prediction is applied to the block on which the prediction is performed. Therefore, the prediction direction may correspond to the uni-directional prediction and the bi-directional prediction. As an example, the encoder and the decoder may perform the processes of S1420 to S1430 in the case in which the motion information (the prediction direction) of the collocated block is the uni-directional prediction rather than the bi-directional prediction. The reason is that in the case in which the prediction direction of the first collocated block is the uni-directional prediction, the L0 input temporal motion information and the L1 input temporal motion information in the input temporal motion information derived from the first collocated block may be the same as each other.

As another embodiment, the encoder and the decoder may determine whether or not they perform the processes of S1420 to S1430 based on information on whether or not the motion information is present in the collocated block. As an example, the encoder and the decoder may perform the processes of S1420 to S1430 in the case in which the motion information is not present in the collocated block. In this case, in the above-mentioned step (S1430), the L0 input temporal motion information rather than the L1 input temporal motion information may be reset. That is, the encoder and the decoder may reset the L0 input temporal motion information to the motion information of the L1 reference picture and perform the uni-directional prediction rather than the bi-directional prediction on the current block. In addition, in the case in which the motion information is not present in the collocated block, in the above-mentioned step (S1430), the encoder and the decoder may also reset both of the L0 input temporal motion information and the L1 input temporal motion information. That is, the encoder and the decoder may reset both of the L0 input temporal motion information and the L1 input temporal motion information to the motion information of the L1 reference picture and may also perform the bi-directional prediction on the current block.

As still another embodiment, the encoder and the decoder may also perform the processes of S1420 to S1430 in the case in which the L0 motion vector and/or the L1 motion vector in the motion information of the collocated block correspond to the zero vector (0,0). In this case, in the above-mentioned step (S1430), the encoder and the decoder may reset the motion vector (motion vectors) corresponding to the zero vector (0,0). As an example, the motion vector (the motion vectors) corresponding to the zero vector (0,0) may be set to the motion vector of the L1 reference picture. As another example, the motion vector (the motion vectors) corresponding to the zero vector (0,0) may also be set to the motion vector of the reconstructed neighboring block. As still another example, the motion vector (the motion vectors) corresponding to the zero vector (0,0) may also be set to a motion vector of a block positioned around the collocated block. As still another embodiment, the encoder and the decoder may also perform the processes of S1420 to S1430 in the case in which the L0 motion vector and/or the L1 motion vector in the motion information of the collocated block do not correspond to the zero vector (0,0). In this case, in the above-mentioned step (S1430), the encoder and the decoder may reset the motion vector (motion vectors) that does not correspond to the zero vector (0,0). The motion vector (motion vectors) that does not correspond to the zero vector (0,0) may be reset to the motion vector of the L1 reference picture.

A condition for determining whether or not the processes of S1420 to S1430 are performed is not limited to the above-mentioned embodiments. That is, various conditions may be applied according to a condition and/or a need.

Meanwhile, the motion information derived from the L1 reference picture may also be the same as the L0 input temporal motion information of the current block. Therefore, the encoder and the decoder may also search the motion information that is not the same as the L0 input temporal motion information when they search the motion information to be used as the final L1 temporal motion information of the current block in the L1 reference picture. For example, as in the above-mentioned S1430, in the case in which the final L1 temporal motion information of the current block is derived based on the L1 reference picture, the encoder and the decoder may use only the motion information different from the L0 input temporal motion information of the current block as the final L1 temporal motion information. In this case, the encoder and the decoder may also select only motion information having a difference of a predetermined threshold or less from the L0 input temporal motion information of the current block as the motion information to be used as the final L1 temporal motion information. Here, the predetermined threshold may be determined based on the mode information of the current block, the motion information of the current block, the mode information of the neighboring block, the motion information of the neighboring block, and the like, and be determined in various schemes.

In the above-mentioned embodiment, the input temporal motion information input to step (S1410) may include an input reference picture index as well as an input motion vector. Here, the L0 input motion vector and the L1 input motion vector may be a motion vector temporally derived based on the collocated block as described above, and the L0 input reference picture index and the L1 input reference picture index may be a reference picture index spatially derived from the reconstructed neighboring block. Here, the L0 input reference picture index and the L1 input reference picture index may be set to the non-negative smallest value among the reference picture indices of the reconstructed neighboring block. Meanwhile, as another example, an L0 input reference picture index and an L1 input reference picture index may also be set to 0 regardless of the motion information of the reconstructed neighboring block.

In the case in which the L1 input motion vector is reset based on the L1 reference picture, the resetting process may also be performed on the input reference picture index. As an example, the input reference picture index may be reset based on the reference picture index derived from the L1 reference picture as described above. As another example, in the case in which the L0 input temporal motion information (for example, the L0 input motion vector, the L0 input reference picture index, and the like) and L1 input temporal motion information (for example, the L1 input motion vector, the L1 input reference picture index, and the like) are the same as each other, the encoder and the decoder may reset both of the L0 input reference picture index and the L1 input reference picture index to a value of 0 to use the reset value as final temporal motion information. The reason is that in the case in which the L0 input temporal motion information and the L1 input temporal motion information are the same as each other, it is likely that both of the L0 reference picture index and the L1 reference picture index will be 0.

Meanwhile, as described above, the encoder and the decoder may reset the value of the L1 input motion vector to the same value as that of the motion vector of the L1 reference picture to derive a final L1 temporal motion vector. In this case, the motion vector of the L1 reference picture may also be scaled and used according to the L1 input reference picture index and/or the reset L1 reference picture index. The L1 input reference picture index may be used as the final L1 reference picture index as it is without being subjected to the resetting process or be subjected to the resetting process and then used as the final L1 reference picture index as in the above-mentioned embodiment. Here, a reference picture corresponding to the motion vector of the L1 reference picture and a reference picture indicated by the final L1 reference picture index may be different from each other. In this case, the encoder and the decoder may perform scaling on the motion vector of the L1 reference picture and use the scaled motion vector as the final L1 temporal motion vector of the current block.

In addition, in the above-mentioned embodiments, the reset L1 temporal motion information may be the same as the L0 temporal motion information of the current block. Therefore, when the reset L1 temporal motion information is the same as the L0 temporal motion information of the current block, the encoder and the decoder may reset the prediction direction information of the current block to the uni-directional prediction. In this case, the encoder and the decoder may use only the L0 temporal motion information as the temporal motion information of the current block. This method, which is a combination with the above-mentioned embodiments, may be applied to the present invention.

Figure 15:
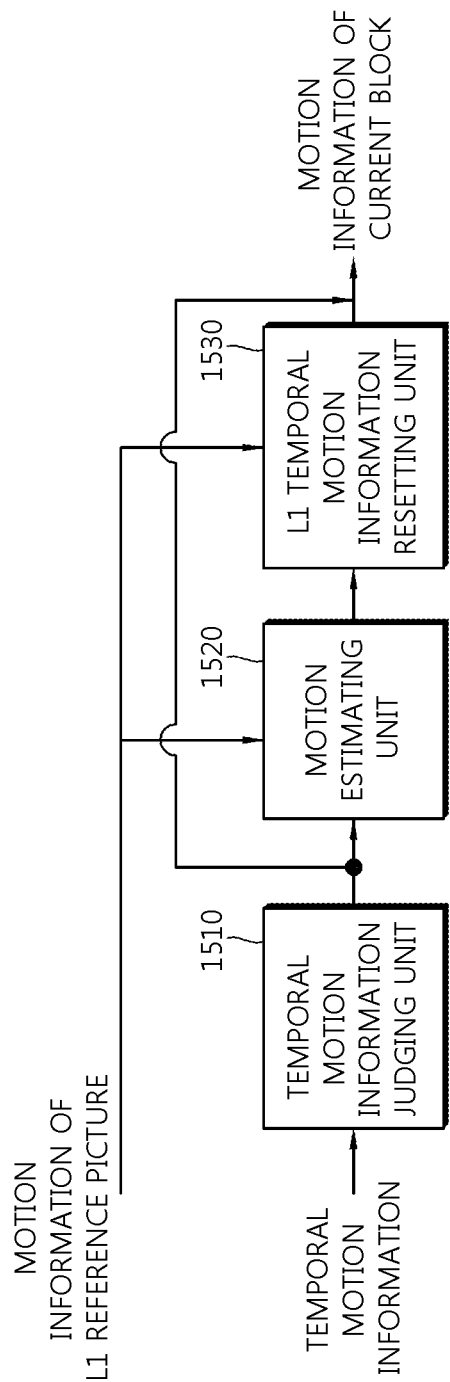
FIG. 15 is a block diagram schematically showing an embodiment of an inter prediction apparatus capable of performing the process of deriving temporal motion information according to the embodiment of FIG. 14.

FIG. 15 is a block diagram schematically showing an embodiment of an inter prediction apparatus capable of performing the process of deriving temporal motion information according to the embodiment of FIG. 14. The inter prediction apparatus according to the embodiment of FIG. 15 may include a temporal motion information judging unit 1510, a motion estimating unit 1520, and an L1 temporal motion information resetting unit 1530.

As described above, the temporal motion information may be derived based on the motion information of the collocated block corresponding to the current block within the previously reconstructed collocated picture. Here, the collocated picture may correspond to one of reference pictures included in a reference picture list as an example. The encoder and the decoder may determine a predetermined relative position based on the block present at the spatially same position as that of the current block in the collocated picture and derive the collocated block based on the determined predetermined relative position (for example, the positions of the inner portion and/or the outer portion of the block present at the spatially same position as that of the current block). The temporal motion information derived based on the collocated block may include prediction direction information, an L0 reference picture number, an L1 reference picture number, an L0 motion vector, an L1 motion vector, and the like.

Referring to FIG. 15, the temporal motion information judging unit 1510 may judge whether or not the L0 input temporal motion information and the L1 input temporal motion information in the input temporal motion information are the same as each other, that is, whether or not the L0 input reference picture number and the L1 input reference picture number are the same as each other and the L0 input motion vector and the L1 input motion vector are the same as each other.

In the case in which the L0 input temporal motion information and the L1 input temporal motion information are not the same as each other, the inter prediction apparatus may use the input temporal motion information as the temporal motion information of the current block as it is. In the case in which the AMVP is applied, the temporal motion information of the current block may be determined or registered to be a prediction motion vector candidate for the current block. Further, in the case in which the merge is applied, the temporal motion information of the current block may be determined or registered to be a merge candidate for the current block. In the case in which the L0 input temporal motion information and the L1 input temporal motion information are the same as each other, a process by the motion estimating unit 1520 may be performed.

Meanwhile, the temporal motion information judging unit 1510 may also judge whether or not the L0 input reference picture number and the L1 input reference picture number are the same as each other rather than whether or not the L0 input temporal motion information and the L1 input temporal motion information are the same as each other or a prediction direction of the collocated block. For example, in the case in which the L0 input reference picture number and the L1 input reference picture number are not the same as each other, the input temporal motion information may be used as the temporal motion information of the current block as it is, and in the case in which the L0 input reference picture number and the L1 input reference picture number are the same as each other, a process by the motion estimating unit 1520 may be performed. As another example, in the case in which the prediction direction of the collocated block is the bi-directional prediction, the input temporal motion information may be used as the temporal motion information of the current block as it is, and in the case in which the prediction direction of the collocated block is the uni-directional prediction, the process by the motion estimating unit 1520 may also be performed.

Again referring to FIG. 15, in the case in which the L0 input temporal motion information and the L1 input temporal motion information are the same as each other, the motion estimating unit 1520 may search or derive the motion information to be used as the final L1 temporal motion information in the L1 reference picture.

As an embodiment, the motion estimating unit 1520 may derive the region that is most appropriately matched or similar to the input block (the original block) corresponding to the current block in the L1 reference picture. In this case, the motion estimating unit 1520 may derive the motion information to be used as the final L1 temporal motion information of the current block based on the derived region. As an example, the motion estimating unit 1520 may derive the motion vector to be used as the final L1 temporal motion information based on the position of the block corresponding to the derived region and the position of the current block and derive the reference picture index (and/or the reference picture number) to be used as the final L1 temporal motion information based on the block corresponding to the derived region.

Meanwhile, in the case in which the motion estimating unit 1520 corresponds to a component of the encoder, the encoder may also allow the motion information derived from the L1 reference picture by the above-mentioned method to be included in the bit stream and be transmitted to the decoder. The motion information derived from the L1 reference picture may include the reference picture index, the motion vector, and the like, and the encoder may independently transmit each of the reference picture index and the motion vector to the decoder. In this case, the encoder may also calculate a difference value between an actual motion vector of the current block and the motion vector derived from the L1 reference picture and then transmit the difference value to the decoder.

In this case, the decoder may determine the motion information to be used as the final L1 temporal motion information based on the transmitted motion information. That is, in the case in which the motion estimating unit 1520 corresponds to a component of the decoder, the motion estimating unit 1520 may determine the motion information to be used as the final L1 temporal motion information based on the motion information (for example, the motion information transmitted from the encoder) input from the outside.

Again referring to FIG. 15, the L1 temporal motion information resetting unit 1530 may use the motion information derived from the L1 reference picture as the final L1 temporal motion information of the current block. That is, in this case, the L1 temporal motion information resetting unit 1530 may reset the L1 input temporal motion information value to the motion information value derived by the motion estimating unit 1520 (the motion information value derived from the L1 reference picture).

The above-mentioned embodiments of FIGS. 6 to 15 may be individually applied, respectively, or be combined with each other by various methods according to an encoding mode of each block. Hereinafter, in embodiments to be described below, a block of which an encoding mode is a merge mode will be called a merge block. An example of a block that is not the merge block may include a block of which an encoding mode is an AMVP mode, or the like. Further, in embodiments to be described below, the current block may correspond to one of the merge block and the block that is not the merge block according to the case.

As an embodiment, the method of deriving temporal motion information according to the embodiments of FIGS. 6 to 8 may be applied to the merge block, and the method of deriving motion information according to the embodiments of FIGS. 12 and 13 may be applied to the block that is not the merge block. In this case, in the merge block, when the L0 input temporal motion information and the L1 input temporal motion information are the same as each other, the motion information of the reconstructed neighboring block may be used as the final L1 temporal motion information of the current block. In addition, in the block that is not the merge block, the L0 motion information of the current block and the L1 motion information of the current block may be independently set, respectively. As an example, one of the L0 motion information of the current block and the L1 motion information of the current block may be spatially derived based on the reconstructed neighboring block and the other thereof may be temporally derived based on the collocated block.

As another embodiment, the method of deriving temporal motion information according to the embodiments of FIGS. 9 to 11 may be applied to the merge block, and the method of deriving temporal motion information according to the embodiments of FIGS. 14 and 15 may be applied to the block that is not the merge block. In this case, in the merge block, when the L0 input temporal motion information and the L1 input temporal motion information are the same as each other, motion information of a newly derived collocated block rather than the collocated block used to derive the input temporal motion information may be used as the final L1 temporal motion information of the current block. In addition, in the block that is not the merge block, when the L0 input temporal motion information and the L1 input temporal motion information are the same as each other, the motion information of the L1 reference picture may be used as the final L1 temporal motion information of the current block.

As still another embodiment, the method of deriving temporal motion information according to the embodiments of FIGS. 6 to 8 may be applied to the merge block, and the method of deriving temporal motion information according to the embodiments of FIGS. 14 and 15 may be applied to the block that is not the merge block. In this case, in the merge block, when the L0 input temporal motion information and the L1 input temporal motion information are the same as each other, the motion information of the reconstructed neighboring block may be used as the final L1 temporal motion information of the current block. In addition, in the block that is not the merge block, when the L0 input temporal motion information and the L1 input temporal motion information are the same as each other, the motion information of the L1 reference picture may be used as the final L1 temporal motion information of the current block.

A combination of the embodiments of FIGS. 6 to 15 is not limited to the above-mentioned embodiments. That is, various types of combinations of the above-mentioned embodiments as well as the above-mentioned embodiments may be provided according to an implementation and/or a need.

In the above-mentioned embodiments, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method for decoding a video signal with an image decoding apparatus, comprising:
   determining a collocated picture of a current block based on collocated picture information signaled from an encoding apparatus,
   wherein the collocated picture information is index information specifying the collocated picture of the current block among reference pictures in a reference picture list, and wherein the collocated picture is determined as one of the reference pictures included in the reference picture list specified by the collocated picture information;
   deriving a temporal motion vector based on a motion vector of a collocated block corresponding to the current block in the collocated picture;
   generating a motion vector candidate list for the current block by using the temporal motion vector;
   deriving a motion vector of the current block based on the motion vector candidate list; and
   performing motion compensation on the current block based on the derived motion vector.

2. The method for decoding a video signal of claim 1, wherein the collocated block is determined by scanning a first block and a second block in a predetermined order.

3. The method for decoding a video signal of claim 2, wherein the scanning is performed in sequence of the first block and the second block.

4. A method for encoding a video signal with an image encoding apparatus, comprising:
- determining a collocated picture of a current block;
- deriving a temporal motion vector based on a motion vector of a collocated block corresponding to a current block in the collocated picture;
- generating a motion vector candidate list for the current block by using the temporal motion vector;
- deriving a motion vector of the current block based on the motion vector candidate list; and
- encoding collocated picture information,
- wherein the collocated picture information is index information specifying the collocated picture of the current block among reference pictures in a reference picture list and is signaled to a decoding apparatus through a bitstream, and
- wherein the collocated picture is specified as one of the reference pictures included in the reference picture list by collocated picture information.

5. A non-transitory computer-readable recording medium storing a bitstream, wherein the bitstream is generated by a method for encoding a video signal, the method comprising:
- determining a collocated picture of a current block,
- deriving a temporal motion vector based on a motion vector of a collocated block corresponding to a current block in the collocated picture;
- generating a motion vector candidate list for the current block by using the temporal motion vector;
- deriving a motion vector of the current block based on the motion vector candidate list; and
- encoding collocated picture information,
- wherein the collocated picture information is index information specifying the collocated picture of the current block among reference pictures in a reference picture list and is signaled to a decoding apparatus through the bitstream, and
- wherein the collocated picture is specified as one of the reference pictures included in the reference picture list by collocated picture information.

* * * * *